United States Patent [19]
Davis

[11] 4,142,177
[45] Feb. 27, 1979

[54] DIGITAL TONE DECODER SYSTEM

[75] Inventor: Walter L. Davis, Plantation, Fla.

[73] Assignee: Motorola, Inc., Schaumburg, Ill.

[21] Appl. No.: 713,746

[22] Filed: Aug. 12, 1976

[51] Int. Cl.² .......... H04Q 9/00; H04M 1/50; H04M 11/02; G01R 23/02

[52] U.S. Cl. .......... 340/171 R; 340/168 R; 340/311; 329/107; 328/140; 179/84 VF; 324/78 D

[58] Field of Search .......... 340/171 R, 171 A, 311, 340/312, 168 B, 168 R; 328/134, 138, 140; 307/233 R; 329/103, 107; 179/84 VF; 324/78 D; 331/1 A, 36 C, 14, 38

[56] References Cited

U.S. PATENT DOCUMENTS

| | | | |
|---|---|---|---|
| 3,760,269 | 9/1973 | Beeman et al. | 324/78 D |
| 3,832,685 | 8/1974 | Hendrickson | 340/146.2 |
| 3,944,982 | 3/1976 | Mogi et al. | 340/171 R |
| 4,021,653 | 5/1977 | Sharp et al. | 328/138 X |
| 4,023,105 | 5/1977 | Woolling, Jr. | 340/168 R X |
| 4,024,477 | 5/1977 | Yamaguchi et al. | 324/78 D X |
| 4,027,146 | 5/1977 | Gilmore | 324/78 D X |
| 4,042,788 | 8/1977 | Richards | 179/84 VF |
| 4,045,767 | 8/1977 | Nishihara et al. | 340/171 PF X |

Primary Examiner—Donald J. Yusko
Attorney, Agent, or Firm—Donald B. Southard; James W. Gillman

[57] ABSTRACT

The digital tone decoder system includes a phase locked loop which receives an input tone signal, which may be accompanied by noise, and produces a replica of the input signal from which the noise has been filtered. The tone signal operates a gate to pass clock pulses from a reference oscillator into a counter for precisely N cycles of the tone signal. The counter provides digital period information of the tone signal which is compared with period (frequency) information of the tone or tone sequence to which the detector system is to respond provided by an address code element. A logic control circuit is activated when lock is acquired by the loop, and this control circuit initiates operation of the other parts of the system and produces the detector output. The clock pulse oscillator also provides system timing and alert tone signals. The detector is capable of decoding and identifying any N-tone signal sequence or group of sequences by use of the required address code element or elements, with the logic control circuit providing the appropriate timing.

25 Claims, 8 Drawing Figures

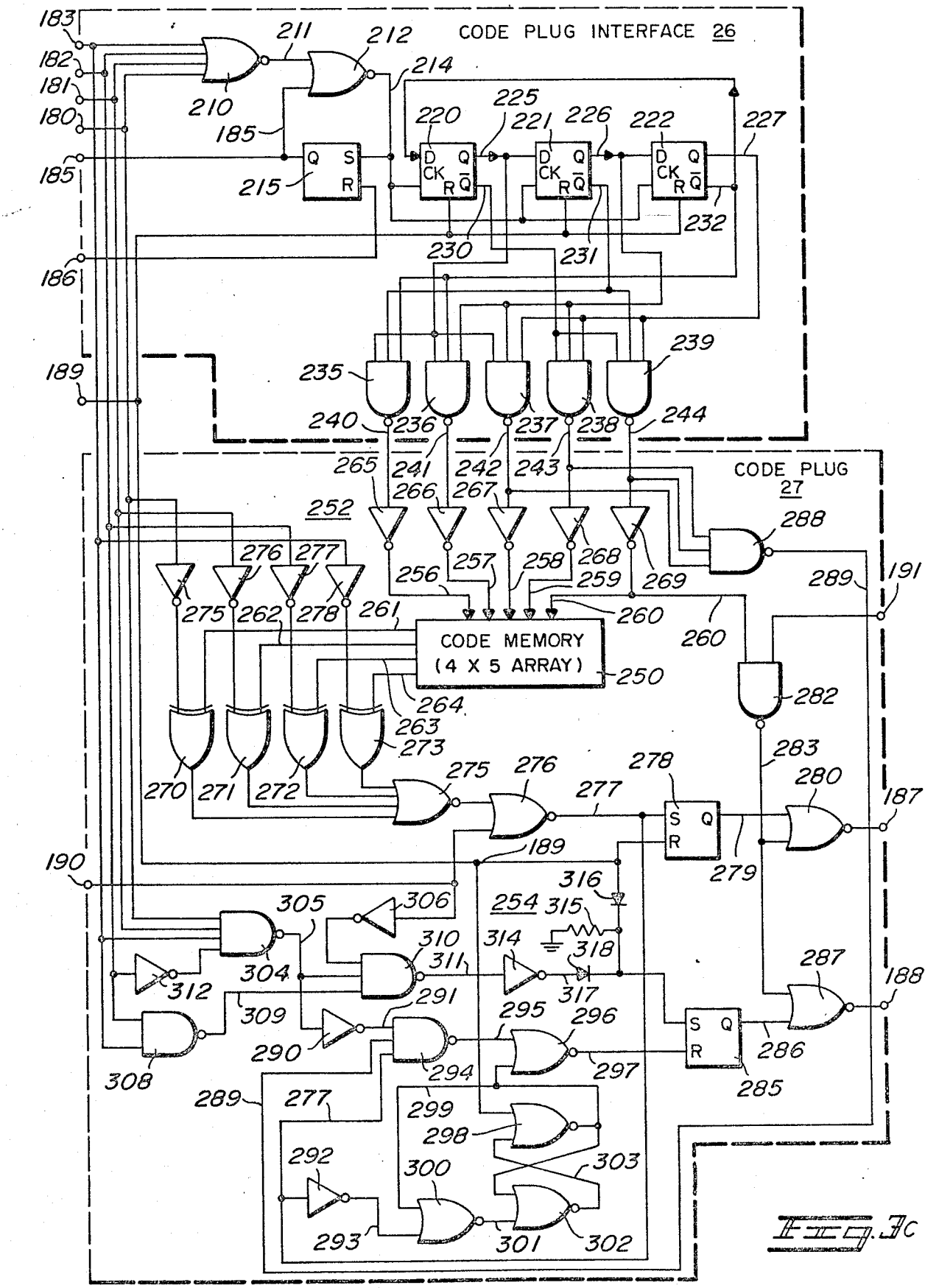

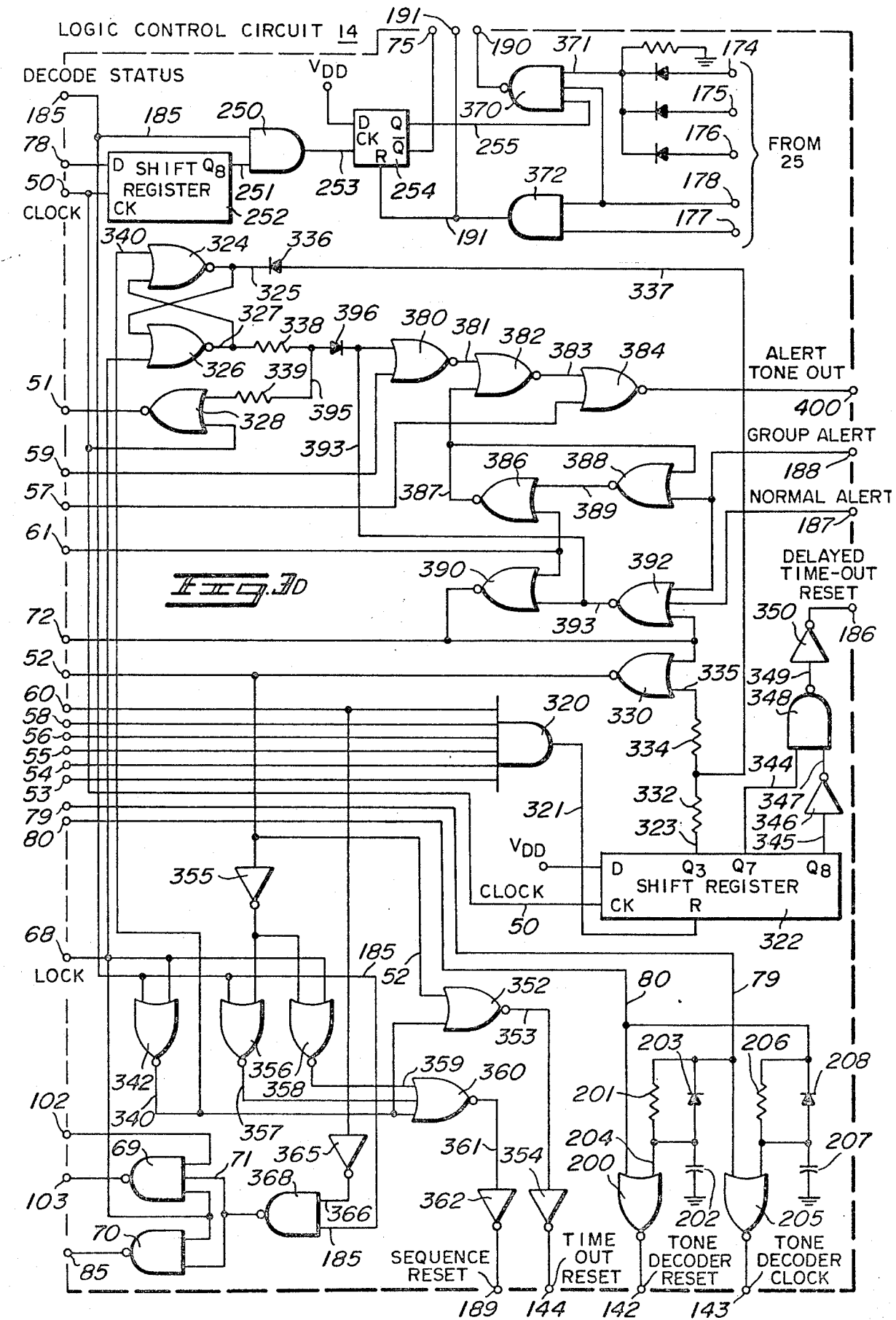

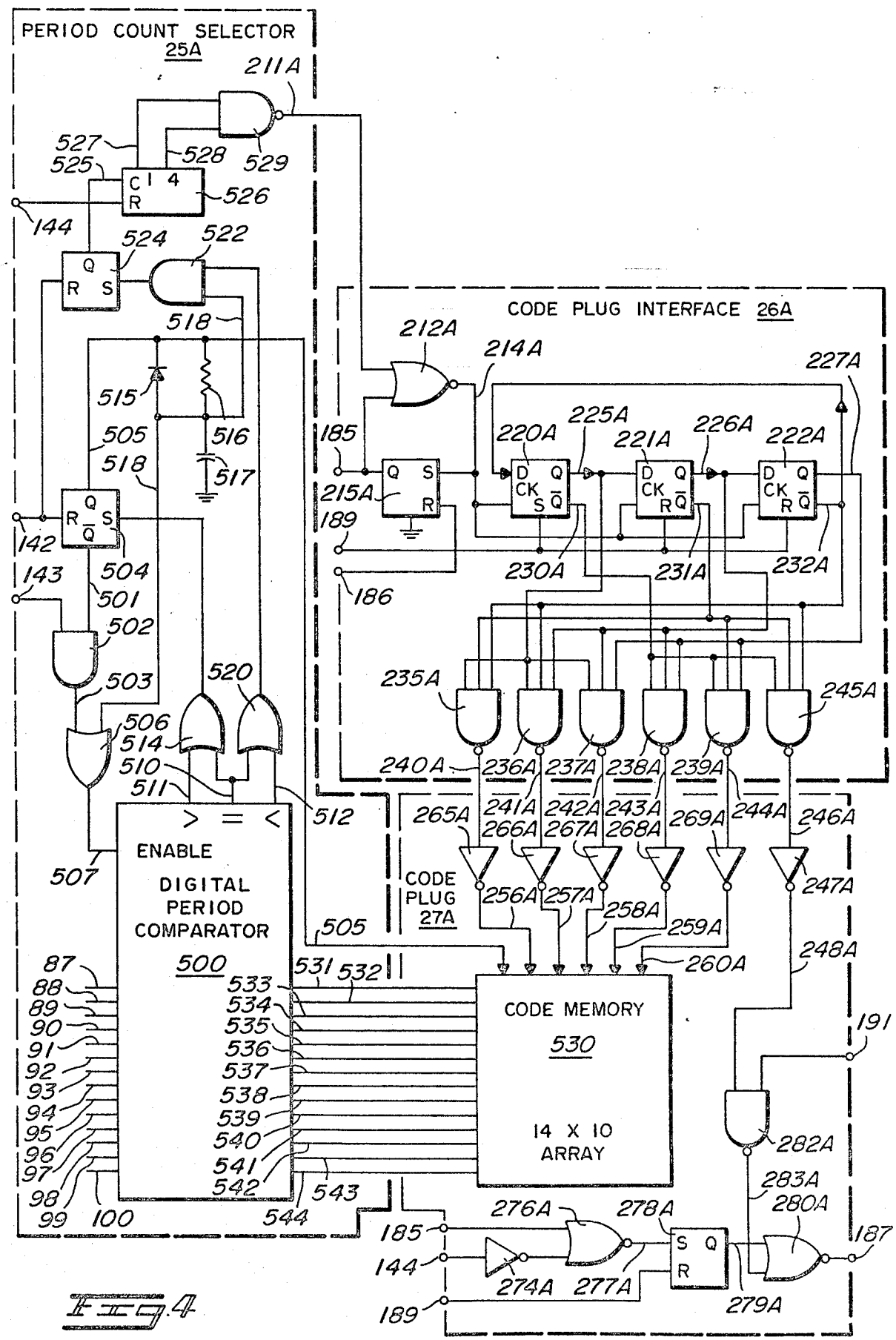

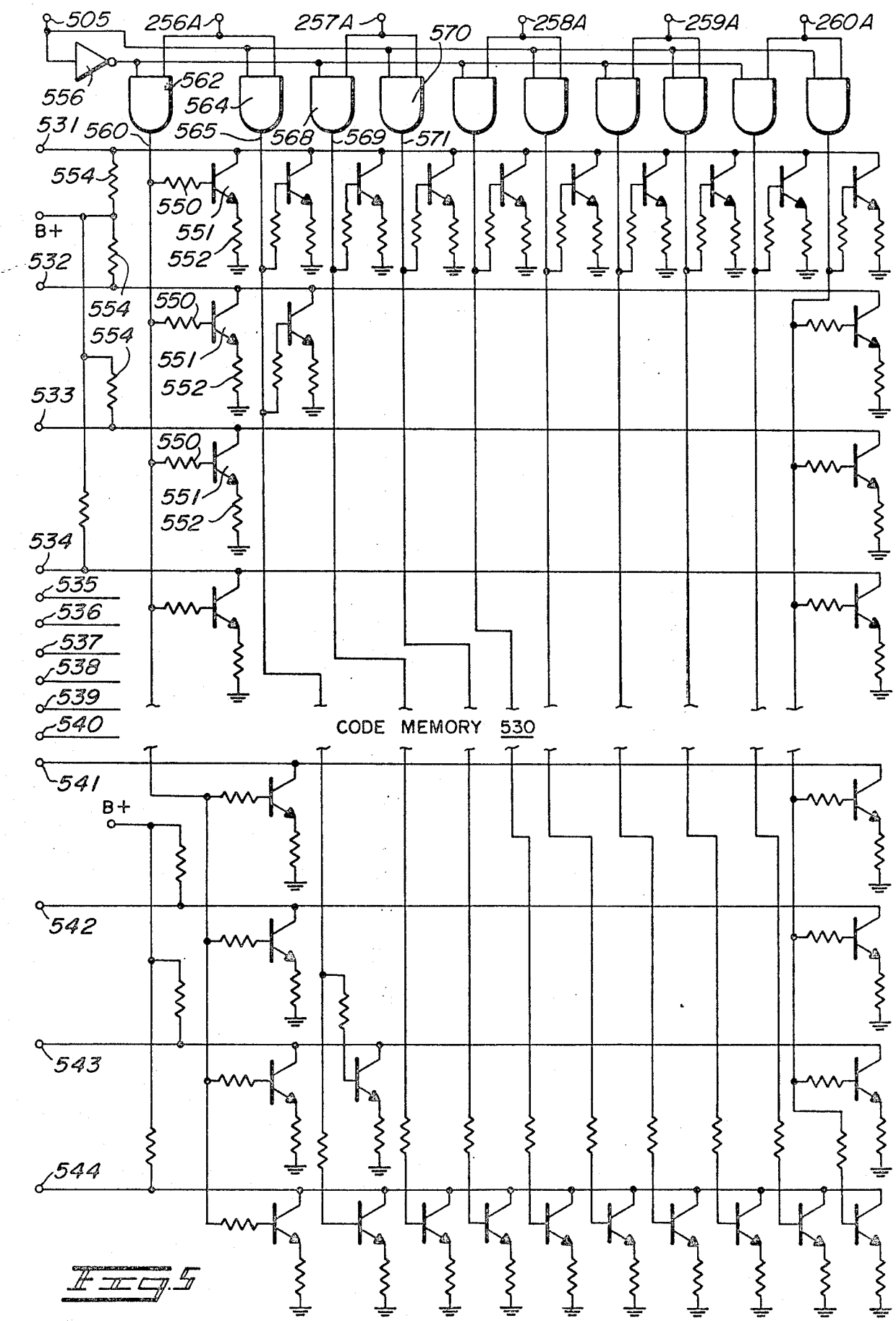

DIGITAL TONE DECODER SYSTEM

BACKGROUND OF THE INVENTION

Tone signalling has been commonly used in communication systems to provide an address so that only a particular station responds to a call. Such systems have included decoders utilizing tone filter elements to respond to the desired tone frequencies. These filter elements have been resonant reed devices, active filters or other expensive elements, and it has been necessary to provide a separate element for each tone used so that the decoders have been relatively costly. In order to change the frequency or frequencies to which such decoders respond, it has been necessary to change the filter element, thus requiring a relatively major change in the decoder. Also, these decoders have been suitable for use with only one tone code form or sequence, and cannot be easily modified to operate with a different code.

Known tone detectors have not provided the sensitivity and selectivity characteristics required for certain applications. Reed devices which may have high selectivity are, in addition to being expensive, quite large and therefore not suitable for use in miniature apparatus. Further, known tone decoder systems have not been adaptable to implementation in the form of a single large scale integrated circuit chip. This has made the decoder system objectionably expensive and not suitable for use in some tone signalling systems.

SUMMARY OF THE INVENTION

It is an object of this invention to provide a tone decoder system which utilizes digital signal processing techniques and forms an improved general purpose tone decoder.

Another object of this invention is to provide a digital tone decoder which is adapted for implementation as a single integrated circuit chip.

A further object is to provide a digital tone decoder system wherein tone selectivity is accomplished by period comparison, and infinite attenuation is provided for signals outside allowable frequency limits.

Still another object of the invention is to provide a digital tone decoder system having highly accurate tone frequency, passband and system timing characteristics.

A still further object is to provide a tone detector system in which the address code is digitally programmed and can be easily changed without changing major components of the system.

Yet another object of the invention is to provide a tone detector system which is capable of decoding and identifying any N-tone signal sequence, or a group of sequences, with the appropriate timing.

In practicing the invention, a phase locked loop circuit is provided which locks an internal signal oscillator with the input tone signal, to provide a signal for processing from which the noise has been filtered. When the signal oscillator is in phase synchronism with the input tone signal, a lock signal is applied to a logic control circuit of the decoder system. The system includes a timing circuit and a period measuring circuit which are activated by the control circuit, and which cooperate to determine the frequency of the input signal by directly measuring the period of the internal signal oscillator. The period measuring circuit includes a gate that is opened for precisely N cycles of the signal wave from the oscillator to feed clock pulses from a reference oscillator in the timing circuit to a period counter. The number of pulses are a measure of the period and frequency of the tone signal. An address code element is coupled to the period measuring circuit and to the control circuit and compares the count from the period counter with pre-set information, and applies an output signal to the control circuit when the count corresponds to the tone to which the decoder is desired to respond. The timing circuit provides system timing information to the control circuit and also signals used to synthesize an audio alert tone.

The address code element can include a period count selector connected to the period counter of the period measuring circuit, a code plug having a code memory in which information representing a particular tone or sequence of tones is pre-set, and an interface circuit for connecting the code plug to the period count selector. The address code element can cause a response to a single tone, a sequence of tones, or a group of tone sequences which are programmed into the code plug or plugs in digital form, as period limits for each tone. The tone selectivity is achieved by digitally processing measured period information and comparing the same with the period (band edge) limits. The logic control circuit provides appropriate timing for the different tone sequences or group of sequences.

BRIEF DESCRIPTION OF THE DRAWINGS

FIGS. 3A, 3B, 3C and 3D together form a complete schematic diagram of one form of the system of the invention;

FIG. 4 is a schematic diagram illustrating a second embodiment of the invention; and FIG. 5 is a circuit diagram of the code memory of FIG. 4.

DETAILED DESCRIPTION OF THE INVENTION

Figure 1:
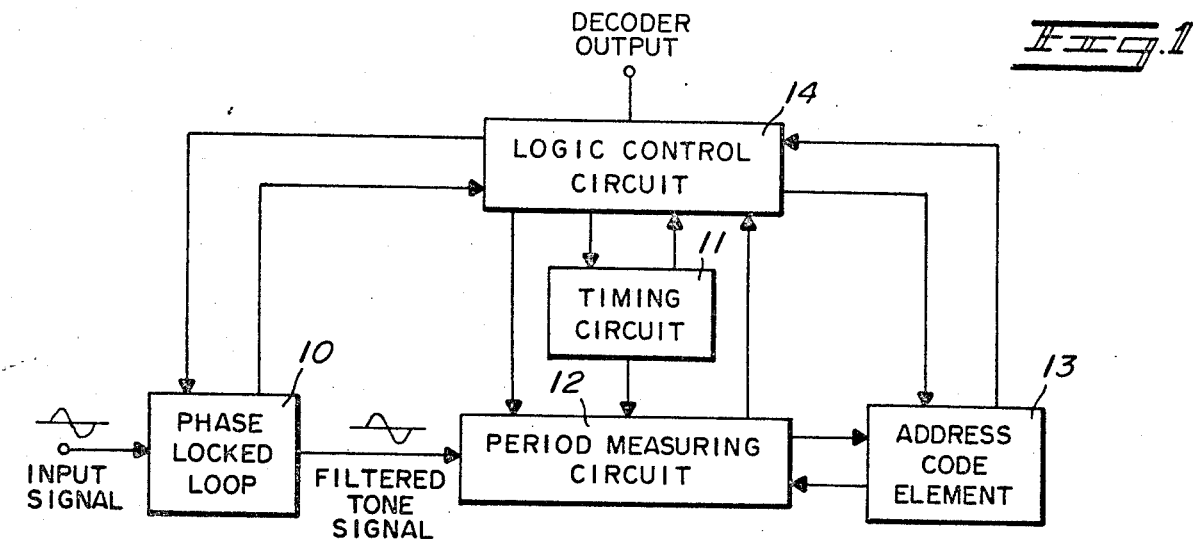
FIG. 1 is the basic block diagram of the system of the invention.

FIG. 1 is the basic block diagram of the digital tone decoder system of the invention. The input tone signal which is to be decoded is applied to a phase locked loop circuit 10 which filters the input signal to provide a substantially noise free signal which is a replica of the input signal. This permits operation with noisy input signals, with the noise being filtered from the tone signal applied to the decoder. The filtered tone signal is applied to a period measuring circuit 12 to which clock pulses are applied from timing circuit 11. A logic control circuit 14, is coupled to the phase locked loop 10, the timing circuit 11, the period measuring circuit 12 and the address code element 13. The phase locked loop 10 applies a signal to the logic control circuit 14 when the loop 10 is locked to the input signal, to initiate a decoding operation. The control circuit 14 activates the timing circuit 11 and the period measuring circuit 12 so that clock pulses are applied to the period measuring current 12 during a predetermined number of cycles of the input signal. The period measuring circuit 12 counts the clock pulses and applies the count information to address code element 13 which is set to represent one or more frequencies of the input signal. The address code element 13 is coupled to the logic control circuit 14 and causes the same to provide the decoder output in response to the frequency or frequencies set in the address code element. The timing circuit 11, in addition to providing clock pulses to the period measuring circuit 12, also provides timing information for the logic control circuit 12, and signals used to provide an alert tone output.

Figure 2:
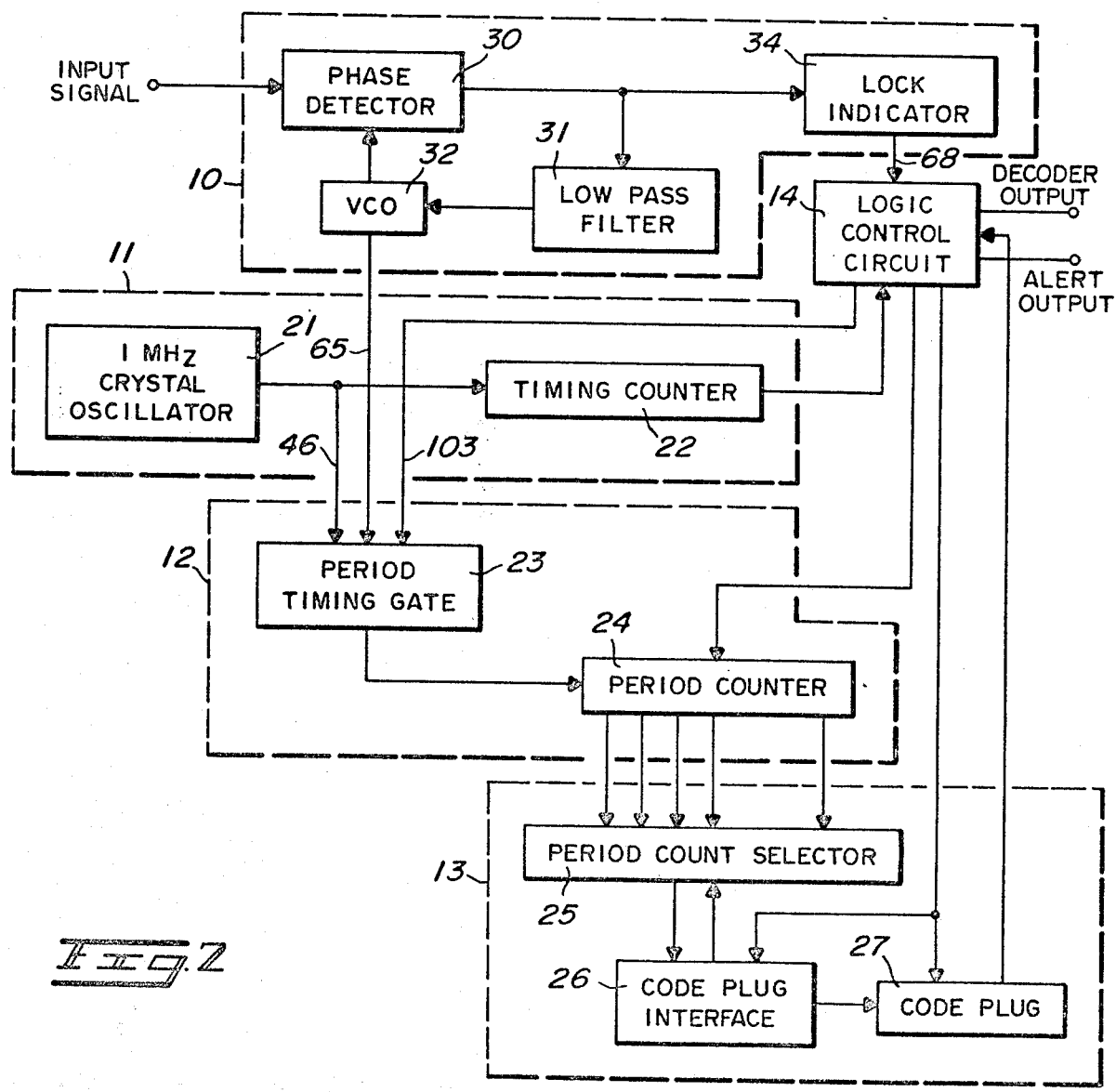
FIG. 2 is a more detailed block diagram of the system of FIG. 1.

FIG. 2 is a more detailed circuit diagram of the digital tone decoder system. The phase locked loop 10 includes a phase detector 30, a low pass filter 31 and a voltage controlled oscillator 32 connected in a well known manner. The input tone signal wave and the signal wave from oscillator 32 are applied to the phase detector 30 which compares the signal waves and provides an error voltage to the low pass filter 31. The filtered error voltage is applied to voltage controlled oscillator (VCO) 32 to control the same so that it is locked in phase with the input signal. A lock indicator 34 is coupled to the phase detector 30 to provide a signal when the loop is locked, as indicated by the error voltage going to zero. The lock indication signal is applied from lock indicator 34 to the logic control circuit 14.

The timing circuit 11 includes a reference oscillator 21 which may be a 1 MHz crystal oscillator. Any stable oscillator having a frequency substantially higher than that of the input tone signal can be used. The accuracy of the decoder system is determined by the accuracy of oscillator 21, so that a highly accurate decoder system can be provided by use of a crystal oscillator. The timing circuit 11 includes a timing counter 22 which receives the clock pulses from the reference oscillator 21. The counter 22 includes frequency divider stages which provide timing pulses to the logic control circuit 14.

The period measuring circuit 12 includes a period timing gate 23 to which signals from oscillator 32 and clock pulses from oscillator 21 are applied. The gate 23 is enabled by a signal from control circuit 14 when oscillator 32 is locked, and passes the clock pulses for precisely N cycles of the wave from oscillator 32. The output of gate 23 is coupled to period counter 24, which is also enabled by the logic control circuit 14. Period counter 24 counts the clock pulses applied thereto, and has a plurality of outputs which indicate the count, to thereby measure the period and the frequency of the applied tone signal.

The address code element 13 of FIG. 2 includes a period count selector 25 which has inputs coupled to the outputs of the period counter 24. The period count selector 25 is coupled through a code plug interface circuit 26 to a code plug 27. The code plug 27 operates in cooperation with the period count selector 25 to provide a signal to the logic control circuit 14 in response to a predetermined output from the period counter 24. The logic control circuit 14 produces the decoder output in response to such signal, and can also produce an alert tone output, with the tone being derived from timing signals provided by the timing counter 22.

Figure 3A:
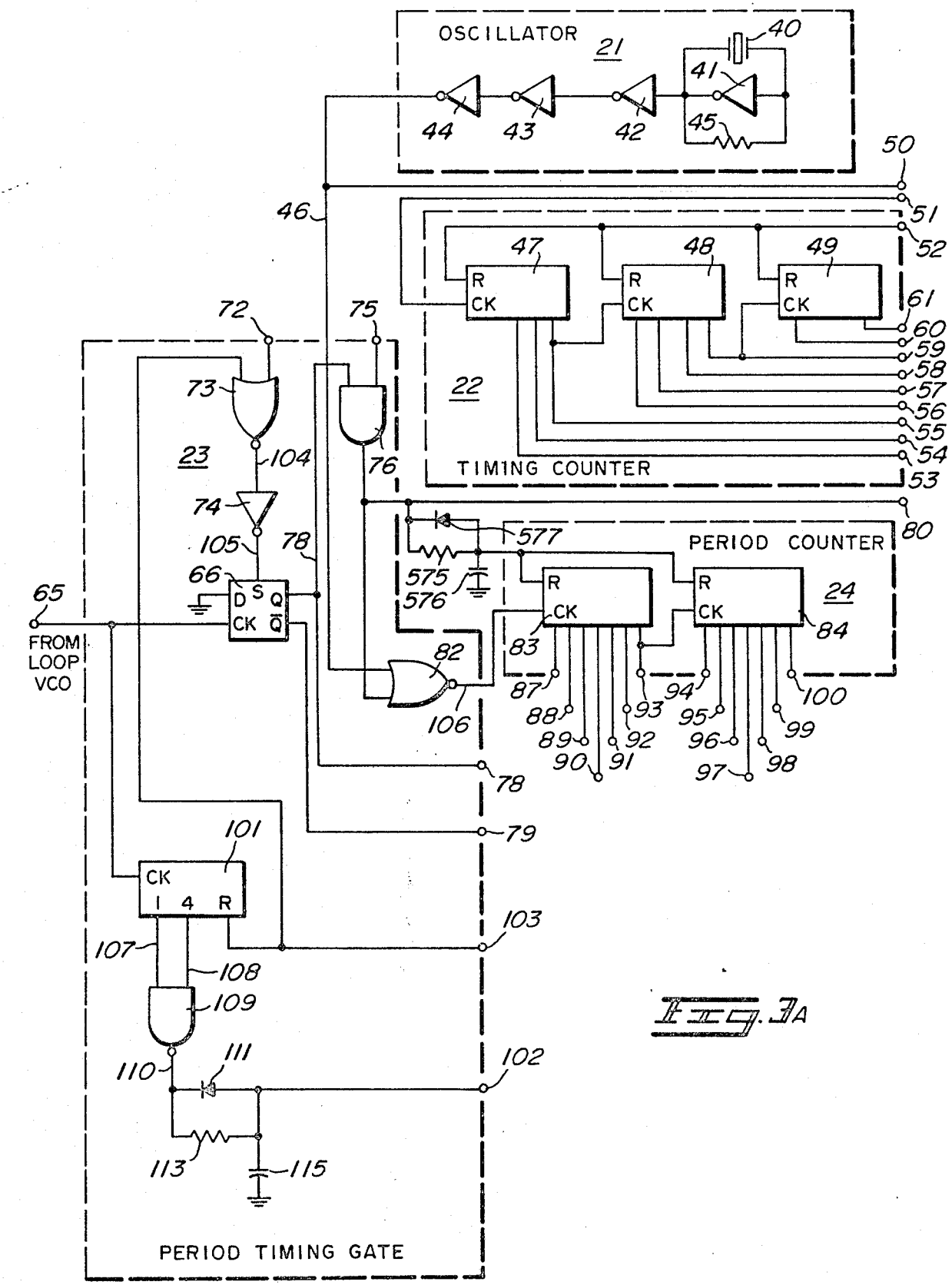

FIGS. 3A, 3B, 3C and 3D of the drawings together form a complete schematic diagram of one embodiment of the digital tone detector system of the invention. These figures do not show the phase locked loop 10 which is adequately illustrated in FIG. 2. FIG. 3A shows the oscillator 21 and the timing counter 22 of the timing circuit 11, the period timing gate 23 and the period counter 24 of the period measuring circuit 12, and the interconnections therebetween. The components shown in FIG. 3A cooperate with components shown in FIGS. 3B, 3C and 3D, and to facilitate the explanation of this cooperation, the same numbers are applied on all figures to common conductors which connect the components.

The oscillator 21 includes a crystal device 40, which is the frequency controlling element of the oscillator. The oscillator frequency may be 1 MHz, although a different frequency may be used if desired for a particular application. The oscillator includes a first inverting amplifier 41 in the oscillator proper and three additional inverting amplifiers 42, 43 and 44 which increase the signal level and produce clock pulses of the desired waveform. The resistor 45 serves to provide a stable DC bias for the oscillator.

The clock pulses from oscillator 21 are applied to the timing counter 22 which includes three integrated circuit frequency dividers 47, 48 and 49 which can be of known construction. The dividers used have seven stages, although outputs are not derived from all the stages. The pulses are applied to the input terminal of divider 47 through a switch in the logic control circuit 14, which is shown by FIG. 3D. The clock pulses are applied from oscillator 21 to terminal 50, which is selectively connected to terminal 51 by the switch, as will be explained. The frequency dividers 47, 48 and 49 are enabled by a potential applied at terminal 52 from the control circuit 14. Outputs from the frequency dividers are applied to lines 53 to 61 connected to the logic control circuit 14. The clock pulses from oscillator 21 are also applied by conductor 46 to the period timing gate 23. The tone oscillations from the internal voltage controlled oscillator (VCO) 32 of the phase locked loop 10 (FIG. 2) are applied to input line 65 of the gate 23. The tone oscillations on line 65 are applied as clock pulses to the "D" flip-flop 66, and to the binary counter 101, which are main elements of the period timing gate 23. To further consider the operation of this gate, it is necessary to consider the connections to and the cooperation with the logic control circuit 14 shown in FIG. 3D.

The decoder logic is activated when a signal is applied to the logic control circuit 14 by the lock indicator 34 (FIG. 2), when the phase locked loop 10 locks to the input tone signal. When a tone is received and the loop 10 is locked, the output on line 68 from the lock indicator 34 raises to a logical "1" level. This output on line 68 is applied as one input to NAND gate 69 of the logic control circuit 14 (FIG. 3D). In the initial state of the decoder system, lines 71 and 102, which form the other two inputs to NAND gate 69 are at the "" level. Thus, when the signal on line 68 rises to the "1" level, all the inputs of gate 69 are high, and the output thereof on line 103 goes low to the "0" level.

Line 103, and line 72 which also comes from the logic control circuit 14, form inputs to the NOR gate 73 of the timing gate 23. With line 103 at the "0" level, and line 72 in the initial state of the decoder also being "0", the output of gate 73 on line 104 goes to the "1" level, and the output of inverter 74 on line 105 goes to the "0" level from an initial "1" level. The removal of the "1" level from line 105, connected to the set input of the flip-flop 66, removes a forced set condition of this flip-flop. As previously stated, the tone oscillations on line 65 are applied to the flip-flop 66, and when the forced set condition is removed, the next positive transition of the tone waveform causes the Q output of this flip-flop on line 78 to go from a "1" level to a "0" level, and the Q̄ output on line 79 to go from a "0" level to a "1" level. The signal on line 78 is applied as one input to AND gate 76, which has a second input from line 75 which comes from the logic control circuit 14. Line 75 is high or at a "1" level at this time, so when line 78 goes to a "0" level, the output of AND gate 76 also goes to a "0" level. This output of gate 76 which is on line 80 forms an input to NOR gate 82, along with the clock pulses applied thereto from oscillator 21 on line 46. The output of NOR gate 82 on line 106 therefore swings between "0" and "1" in accordance with the clock pulse waveform.

As a result of the logic sequence which has been described, clock pulses from the reference oscillator circuit 21 are applied to line 106, which forms the input to the period counter 24, during a time interval that begins with a positive transition of the tone waveform from the VCO 32 (which is simply a filtered version of the input tone signal). During the positive transition of each subsequent cycle of the tone waveform applied at terminal 65, the counter 101, to which this wave is also applied, advances one count. When this counter has reached a count of five, indicating that four full cycles of the input waveform have been received, the "1" and "4" outputs of counter 101 on lines 107 and 108 are both high. This causes the output of NAND gate 109 to go low so that line 110 goes to a "0" level. This is applied through diode 111 to bring line 102 to a "0" level. The "0" level on line 102 is applied to gate 69 of the logic control circuit 14 (FIG. 3D) so that the output of this gate goes high and applies a "1" level to line 103. The "1" level on line 103 is applied to counter 101 to reset the same so that the outputs thereof on lines 107 and 108 return to "0". The high or "1" level on line 103 is also applied to NOR gate 73 and causes the output on line 104 to go to "0", which in turn causes the output of inverter 74 on line 105 to return to a "1" level. The "1" level on line 105 sets flip-flop 66 so that the output thereof on line 78 goes to a "1" level and the output on line 79 goes to a "0" level. This acts through AND gate 76 to force line 80 to a "1" level (line 75 remains high during this period). The "1" level on line 80 causes NOR gate 82 to provide a "0" level on line 106, so that the clock signal applied thereon is terminated at the end of four cycles.

The sequence described causes the clock signal applied from line 46 via gate 82 to input 106 of the period counter 24 at the start or positive transition of a cycle of the tone from VCO 32, to be removed after exactly four periods of the tone waveform have elapsed. Thus the number of clock pulses applied to and counted by the period counter 24 indicate the time interval or period length of four cycles of the input tone waveform, which is a measure of the frequency of the input tone signal. Although the operation with four periods of the waveform has been described, it will be obvious that a different number of periods can be used, as may be desirable in a particular application.

The period counter 24 includes integrated circuit dividers 83 and 84, which may be known devices. The output of AND gate 76 on conductor 80 is applied through a delay circuit to reset inputs of the dividers so that they are reset at the start of the counting operation. The period counter 24 forms a fourteen stage binary counter, and the outputs of the counter stages are brought out on lines 87 to 100, with the state of the counter being indicated by the binary signal levels on these lines. The counter 24 counts the clock pulses applied so that the outputs on lines 87 to 100 indicate the number of clock pulses that have been applied. These lines are connected to the period count selector 25 which is shown on FIG. 3B.

The period count selector 25 interprets or decodes the binary signals on the lines 87 to 100 from the period counter 24 by converting the same to a form so that the measured period can be directly compared with the period limits of the tone to be detected. The period count selector 25 as shown on FIG. 3B includes three functional blocks, the period count decoder 28, the tone selector circuit 29 and the tone selector encoder 38.

The period count decoder 28 includes three four line to sixteen line binary to hexadecimal decoders and one two line to four line binary decoder that are used to convert the count in the period counter 24 into a form that can be used by the tone selector circuit 29. Each of the hexadecimal decoders has four inputs that are connected to successive output lines from the counter 24, and sixteen output pins. The decoder 112 has inputs connected to lines 87, 88, 89 and 90, decoder 114 has inputs connected to lines 91, 92, 93 and 94, and decoder 116 has inputs connected to lines 95, 96, 97 and 98 from counter 24. Each output pin represents one binary combination of the four input signals, and the output pin which represents the particular binary combination applied at the inputs is at a logical "1" level while all the other outputs of the decoder are at the "0" level. The outputs of decoders 112, 114 and 116 are numbered φ, 1, 2, 3, 4, 5, 6, 7, 8, 9, A, B, C, D, E and F on the drawing, in accordance with the standard notation. In addition to the inputs which have been referred to, each of the decoders has an inhibit input connected to line 80 from the period timing gate 23.

In addition to the three binary decoders 112, 114 and 116, the period count decoder 28 has a fourth decoder 117 which includes four NOR gates 118, 119, 120 and 121. These gates are connected to the last two output lines 99 and 100 from counter 24. These output lines are connected to the gates directly and through inverters 123 and 124 to form four input connections from which four outputs are provided. Each output represents one binary combination of the two input signals applied, and the output of the gate representing the signals applied will be at a logical "1" level while the outputs on the other three gates will be at the "0" level. These outputs are numbered 0, 1, 2 and 3 on the drawing.

The combination of the outputs of the four decoders 112, 114, 116 and 117 will uniquely determine the value of the count in the period counter 24. That is, each of the four decoders will have one output pin or line on which a logical "1" level is present for every condition of the period counter 24, and the particular pins and line having the "1" level will uniquely determine the count. The decoders can be considered to range from least significant to most significant as the digits in a number, with decoder 112 providing the least significant digit (LSD), decoder 114 providing the third most significant digit (3rd MSD), decoder 116 providing the second most significant digit (2nd MSD) and decoder 117 providing the most significant digit (MSD). A set of four outputs, one from each decoder, will be at a logical "1" level for each binary output pattern on the fourteen output lines 87 to 100 from the period counter 24.

Figure 3B:
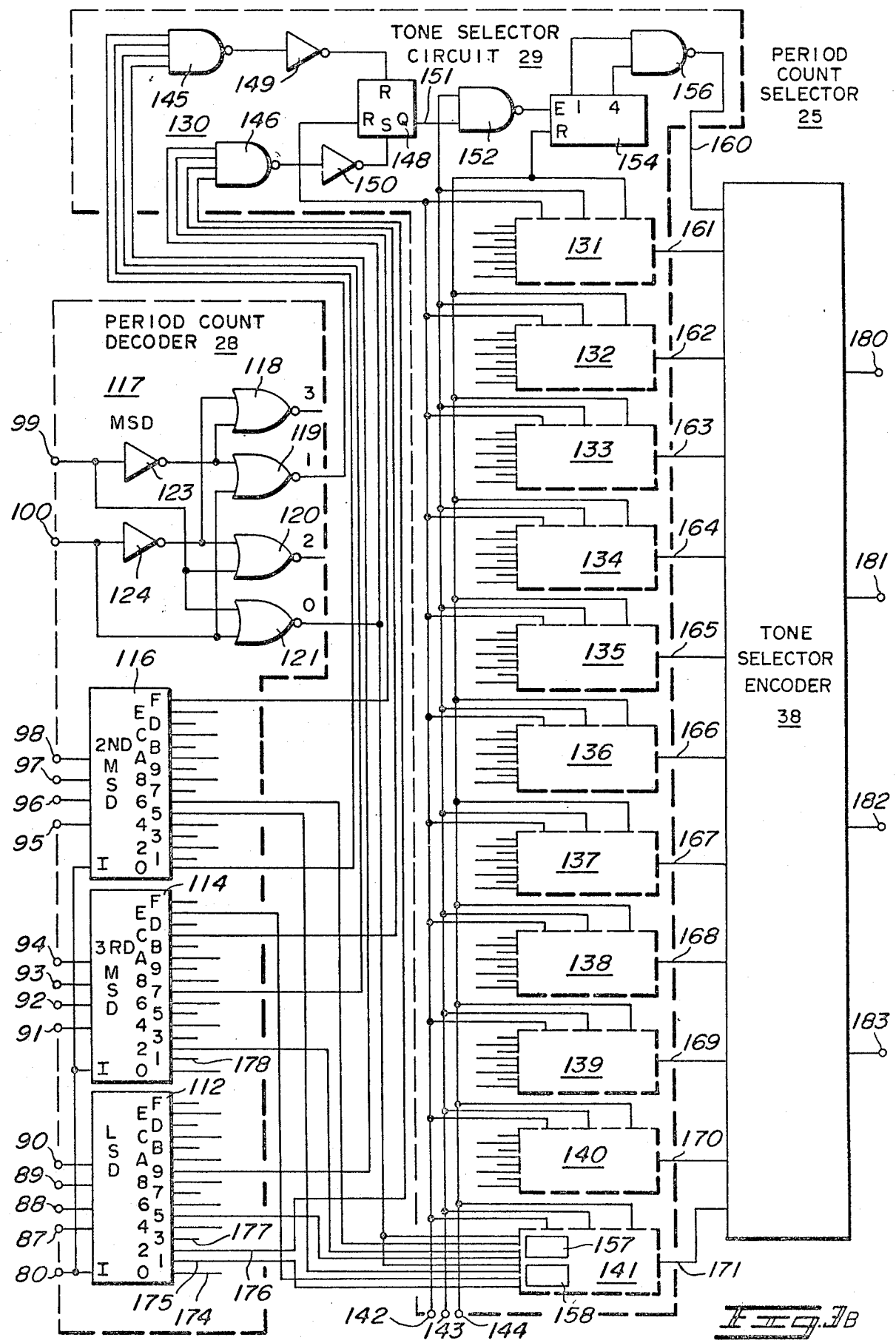

The tone selector circuit 29 has a plurality of tone period elements, with twelve elements 130 to 141 being shown in FIG. 3B. These elements may all be identical and only element 130 is shown in schematic diagram form, with the elements 131 to 141 being shown as blocks. The element 130 includes two four input NAND gates 145 and 146, and an R-S flip-flop 148 having set and reset inputs connected to the outputs of gates 145 and 146 by inverters 149 and 150, respectively. Line 142 from the logic control circuit 14 is connected to a second reset input of flip-flop 148 to insure that the flip-flop is clear at the start of a decoding sequence. The selector element 130 includes a NAND gate 152 having one input connected to the output of flip-flop 148, and a second input connected to line 143 from logic control circuit 14 which applies interrogation pulses thereto. The output of gate 152 is applied to the enable input of binary counter 154 so that the counter is clocked by the pulses applied thereto by the gate. Line 144 from the logic control circuit is connected to the reset input of counter 154 to reset the same prior to a decoding sequence. A NAND gate 156 has two inputs connected to the "1" and "4" outputs of counter 154 to provide an output on line 160 when the condition of the counter corresponds to the number 5. The line 160 forms the output of tone period element 130.

Each of the four inputs of NAND gate 145 is connected to an output of one of the decoders 112, 114, 116 and 117. Similarly, each of the inputs of NAND gate 146 is connected to an output of one of the decoders. The tone period elements 131 to 141 also have two four input NAND gates having inputs connected to the outputs of the decoders 112, 114, 116 and 117. The elements 131 to 141 can operate in the same way as element 130, and have output lines 161 to 171 which together with output line 160 of element 130 are connected to the tone signal wave. In the system described, the period counter 24 counts clock pulses during four cycles of the received tone signal wave to thereby measure the period, and the frequency of the tone signal wave. The NAND gates 145 and 146 of element 130, and corresponding NAND gates of the other elements, are connected to outputs of the decoder 28 so that each responds to a particular count from period counter 24. The gate 145 responds to the upper period (lower frequency) limit, and the gate 146 responds to the lower period (upper frequency) limit of the tone to which the element 130 responds. Each element provides a logic "0" level on its output line 160 to 171 when the count from counter 154 reaches five, indicating that the period count has been between the limits represented by the connections from decoder 28 to the input NAND gates of the selector element.

The following tables show the twelve tone frequencies which may be used, with the upper and lower frequency limits which define the band for each tone. Table I shows the upper frequency limits and the corresponding period limits as defined by the count of counter 24 and the connections of decoder 28. Table II shows the lower frequency limits and the corresponding period limits. The outputs of decoder 28 are connected to the input NAND gates of the selector elements as shown by the table, so that each element responds when one of the twelve tones is received which has a frequency falling between the specified limits.

TABLE I

| | UPPER FREQUENCY LIMIT - LOWER PERIOD LIMIT | | | | | |
|---|---|---|---|---|---|---|
| Tone No. | Center Frequency | Frequency | Period Counter 24 | Decoder 28 Connections | Period Element | Gate |
| 1 | 970 | 991.6 | 4034 | OFC2 | 130 | 146 |
| 2 | 1060 | 1083.4 | 3692 | OE6C | 131 | |
| 3 | 1160 | 1185.4 | 3374 | OD2E | 132 | |
| 4 | 1270 | 1298.3 | 3081 | OCO9 | 133 | |
| 5 | 1400 | 1431.1 | 2795 | OAEB | 134 | |
| 6 | 1530 | 1563.7 | 2558 | O9FE | 135 | |
| 7 | 1670 | 1707.2 | 2343 | 0927 | 136 | |
| 8 | 1830 | 1870.9 | 2138 | 085A | 137 | |
| 9 | 2000 | 2045.0 | 1956 | 07A4 | 138 | |
| 10 | 2200 | 2248.4 | 1779 | 06F3 | 139 | |
| 11 | 2400 | 2454.0 | 1630 | 065E | 140 | |
| 12 | 2600 | 2657.8 | 1505 | O5E1 | 141 | 158 | selector encoder 38. The encoder 38 can be a standard decimal to binary converter which converts the twelve decimal inputs from the elements 130 to 141 to binary outputs on the four lines 180, 181, 182 and 183. All the inputs are normally high, and when a selector element responds to a tone its output goes low. The encoder converts this input from the selector element to the binary number which identifies this selector element.

As previously stated, the digital tone decoder system of the invention can be used with codes of different types, with the system illustrated by FIGS. 3A, 3B, 3C and 3D being for use with a code formed by five tones applied in sequence. Each tone can be one of twelve different frequencies, with ten of the tones representing the numbers 1 to 9 and 0, the eleventh tone being for group call and the twelfth tone being for repeat. The code can therefore be represented by a five digit number.

Each tone period element 130 to 141 of the circuit 29 responds to one of the twelve tones and responds when the received tone falls within predetermined frequency limits. The frequency of the received tones is measured by counting the number of clock pulses which occur during a prescribed number of cycles of the received tone signal wave, and therefore, measures the period of

TABLE II

| | LOWER FREQUENCY LIMIT - UPPER PERIOD LIMIT | | | | | |
|---|---|---|---|---|---|---|
| Tone No. | Center Frequency | Frequency | Period Counter 24 | Decoder 28 Connections | Period Element | Gate |
| 1 | 970 | 948.5 | 4217 | 1079 | 130 | 145 |
| 2 | 1060 | 1036.8 | 3858 | OF12 | 131 | |
| 3 | 1160 | 1134.4 | 3562 | ODC6 | 132 | |
| 4 | 1270 | 1241.8 | 3221 | OC95 | 133 | |
| 5 | 1400 | 1368.9 | 2922 | OB6A | 134 | |
| 6 | 1530 | 1496.4 | 2673 | OA71 | 135 | |
| 7 | 1670 | 1633.3 | 2449 | 0991 | 136 | |
| 8 | 1830 | 1789.7 | 2235 | 08BB | 137 | |
| 9 | 2000 | 1956.0 | 2045 | 07FD | 138 | |
| 10 | 2200 | 2151.7 | 1859 | 0743 | 139 | |
| 11 | 2400 | 2347.4 | 1704 | 06A8 | 140 | |
| 12 | 2600 | 2542.9 | 1573 | 0625 | 141 | 157 |

In FIG. 3B, the connections from the period count decoder 28 to the NAND gates 145 and 146 of tone element 130, and the connections to the NAND gates 157 and 158 of tone element 141, are shown. As shown by Table I, the lower period limit gate 146 is connected to the 0 output of decoder 117, the F output of decoder 116, the C output of decoder 114 and the 2 output of decoder 112. Thus, the outputs representing the hexadecimal number 0FC2 are connected to gate 146 and provide the lower period limit (upper frequency limit) for selector 130. The upper limit gate 145 is connected to the outputs of decoder 28 representing the hexadecimal number 1079, as indicated by Table II.

Connections from the decoder 28 to the period elements 131 to 141 are shown by the tables. Although element 141 is not shown schematically, the input NAND gates 157 and 158 and the connections thereto are shown. The lower limit period gate 158 is connected to outputs 05E1 of decoder 28, and the upper limit gate 157 is connected to outputs 0625 thereto.

The connections of tone period elements 131 to 140 are not shown on the drawing to simplify the same. Further, it will be apparent that tone frequencies other than those indicated on the tables can be used, and the selector elements will respond to other frequencies by simply connecting the input NAND gates thereof to the proper outputs of decoder 28. In the tables, the frequency and period limits are set at ± 2.2% from the center frequency as this has provided the desired accuracy for a particular application. However, the limits can be set at a different percent variation from center frequency, and the connections can be made from the selector elements to the decoder 28 to provide operation within such limits.

Considering now the operation of the period count selector 25, when a tone is received and the phase locked loop 10 (FIG. 2) locks, a logic "1" level is applied from lock indicator 34 on line 68 to the logic control circuit 14 (FIG. 3D). The gate 69 in circuit 14 then applies a "0" level on line 103 which acts through gate 73 and inverter 74 to remove the forced set condition from flip-flop 66. On the next positive transition of the tone signal from VCO 32 applied on line 65, the output line 78 from the flip-flop 66 goes from a "1" level to a "0" level and the output line 79 goes from a "0" level to a "1" level. Line 80 also goes to a "0" level by action of gate 76, as has been explained.

The change in state on lines 79 and 80 causes a momentary reset pulse to be generated by NOR gate 200 of the logic control circuit 14 (FIG. 3D). This results since the "0" level on line 79 prior to the change in state is applied through resistor 201 and diode 203 to capacitor 202. Capacitor 202 holds this "0" level so that it is applied by line 204 to one input of gate 200 for a short time after lines 79 and 80 change state. Accordingly, when line 80 goes to "0", both inputs to gate 200 are low and the output of this gate, which is applied to line 142, goes high or to a logic "1" level to thereby provide a reset pulse. After capacitor 202 charges to a "1" from the "1" on line 79, the output of gate 200 on line 142 returns to a "0" level. The reset pulse on line 142 is applied to the R-S flip-flop 148 of selector element 130 (FIG. 3B), and to corresponding flip-flops in the other selector elements 131 to 141. This forces the outputs of all these R-S flip-flops to a zero level so that they are ready for a selection action.

At the same time that line 79 changes from "0" to "1", and line 80 goes to "0", the clock pulses are applied to period counter 24 which counts the pulses for four cycles of the tone waveform. The reset pulse on line 142 is very short and terminates before the period count is complete. As the count reaches the lower period limit (1505) of the shortest period tone (the highest frequency tone), which is tone No. 12, the low period limit gate 158 in period element 141 produces an output which forces the output of the flip-flop in that element to a "1" level. Although this flip-flop is not shown on the drawing, it will be identical to the flip-flop 148 in element 130. If the tone frequency is lower than the lower limit of tone No. 12, the counter will continue to count pulses and when it reaches the higher period limit (1573) of tone No. 12, gate 157 will operate to provide an output to the flip-flop of unit 141 which forces the output of the flip-flop to a zero level. As the count continues, the flip-flops in the tone period elements 140 to 131 will be set and reset in turn as the count reaches the limit values. Then at the end of the count, one of the flip-flops is set if the received tone is between the limits of one of the tones to which the decoder responds.

We will assume that the tone being received is tone No. 1, as the period element 130 for this tone is shown schematically. This tone has a frequency of 970 Hz, and the period counter 24 will receive 4123 clock pulses during four cycles of this tone. As previously stated, the output of period counter 24 is a fourteen bit binary number, but for simplicity the counts are shown in the tables as decimal numbers. As the count proceeds from 1505, which is the lower period limit of the shortest period tone (tone No. 12) to a count of 3859, which is the upper period limit of tone No. 2, the flip-flops in elements 141 and 131 will be set and reset in turn. When the count reaches 4034, which corresponds to a frequency of 991.6 Hz, the upper frequency limit of tone No. 1, the OFC2 outputs of decoder 28 which are connected to gate 146 in selector unit 130 are all at "1" levels. The output of gate 146 is then at a "0" level and the inverter 150 applies a "1" level to the set input of flip-flop 148. This causes the flip-flop 148 to provide a "1" level output on line 151.

Although the output of gate 146 is returned to a "1" level as soon as the count continues to 4035, the output of the flip-flop 148 on line 151 remains at the "1" level. When the count reaches 4123, which is the count for the tone frequency received (970 Hz), the flip-flop 148 will remain set since the count did not reach 4217, which is the upper period limit for tone No. 1, and which count would operate the upper period limit gate 145 to reset the flip-flop 148. The presence of this "1" at the output of flip-flop 148 at the end of the counting interval indicates that the count was between the period limits of the period element 130.

After four cycles of the tone waveform have been received by binary counter 101 of the period timing gate 23 (FIG. 3A), this counter provides outputs on line 107 and 108 to cause line 102 to go to a "0" level. This acts through gate 69 in the logic control circuit 14 to apply a "1" level on line 103 which resets counter 101 and sets flip-flop 66 so that output line 78 thereof goes to a "1" level, and line 79 goes to a "0" level, all as has been explained. The "1" level on line 78 acts through gate 76 to provide a "1" level on line 80, which in turn acts through gate 82 to terminate the application of clock pulses to period counter 24.

The change in state of lines 79 and 80 causes NOR gate 205 of the logic control circuit 14 (FIG. 3D) to momentarily apply a "1" level to line 143. The "0" level which had been on line 80 during the counting action was applied through resistor 206 and diode 208 across capacitor 207, and the "0" level across capacitor 207 is applied to one input of gate 205. When line 79 goes to "0", both inputs to gate 205 are "0", so that the output thereof rises to a "1" level. This output lasts for only a short time as line 80 is now at a "1" level and capacitor 205 charges therefrom to apply a "1" level input to gate 205, so that its output returns to the "0" level. The "1"

level at the output of gate 205 is applied by line 143 to the selector elements 130 to 141 of the tone selector circuit 29 (FIG. 3B).

The "1" level which appears momentarily on line 143 indicates that the period measurement for four cycles of the tone has been completed. The line 143 is connected to NAND gates in the selector elements, such as NAND gate 152 in element 130. This acts to interrogate the flip-flops in the period elements to determine if a valid tone has been received by any element. In the example given wherein the tone has been received by element 130, the "1" output of flip-flop 148 on line 151, and the "1" input on line 143 are both applied to the NAND gate 152 and causes the output thereof to go to a "0" level. This is applied to the enable input of binary counter 154 so that the count thereof is advanced by one. The counter 154 has been reset prior to the selection action by line 144 from the logic control circuit 14.

When the counter 101 is reset after four cycles of the tone waveform, the outputs 107 and 108 thereof return to the "0" level, and the output of gate 109 changes to the "1" level. This level on line 110 is applied to line 102 with a delay resulting from the action of resistor 113 and capacitor 115. If the phase locked loop 10 has remained locked, all the inputs of gate 69 are returned to a "1" level, so that the output thereof on line 103 returns to a "0" level. This removes the set condition of flip-flop 66 so that, on the next positive transition of the tone waveform, output 78 of the flip-flop goes to the "0" level and output 79 goes to the "1" level. This acts, as previously described, to apply clock pulses to the period counter 24, and to apply a momentary reset pulse to line 142 which resets the flip-flop 148 in tone period element 130, and the corresponding R-S flip-flops in the other period elements 131 to 141. Assuming that the No. 1 tone is still present, the flip-flop 148 will again be set by the output from the lower period NAND gate 146, and when the interrogation pulse appears on line 143 at the end of four cycles of the tone waveform, the NAND gate 152 will apply a "0" level to counter 154 so that the count is again advanced by one.

The binary counter 154 can be connected to NAND gate 156 to operate the same after the period of the tone has been measured a given number of times. The above description has dealt with two period measurements, and it may be desired to use five such period measurements. If the flip-flop 148 remains set at the end of all five measurements, the gate 152 will cause the counter 154 to be advanced five times. This will produce "1" outputs on the two lines from counter 154 to NAND gate 156 so that the output of NAND goes to "0" level. This "0" level is applied on output line 160 which is connected to the tone selector encoder 38.

As previously stated, the tone selector encoder 38 can be a standard decimal to binary converter. The twelve input lines 160 to 171 normally all have a "1" level and this results in a binary zero output on lines 180 to 183. When one of the period elements 130 and 141 responds to the applied tone, its output line 160 to 171 will go to a "0" level and this will produce a binary output on lines 180 and 183 which indicates the particular period element that has responded. This in turn will identify the valid tone which has been received as one of tones No. 1 to No. 12. The output of the encoder 38 which identifies a valid tone will terminate the selection process, as will be explained.

The four outputs from the tone selector encoder 38 on lines 180, 181, 182 and 183 are applied to the code plug interface circuit 26, which is shown on FIG. 3C. These lines are connected to the four inputs of NOR gate 210, and are normally all at the logic "0" level, so that the output of gate 210 is normally at "1" level. This output is applied as one input of NOR gate 212, which has an output normally at the "0" level. The output of gate 212 on line 214 is applied to control flip-flop 215, and also to the flip-flop 220, 221 and 222 which form a ring counter. The output of flip-flop 215 on line 185 forms the second input to NOR gate 212, and this output is normally at a "0" level, as will be explained.

The flip-flop 220, 221 and 222 of the ring counter are normally in a reset condition so that the outputs on lines 225, 226 and 227 thereof are at logic "0" levels, and the outputs on lines 230, 231 and 232 are at logic "1" levels. The output lines from the flip-flops of the ring counter are connected as inputs to five NAND gates 235, 236, 237, 238 and 239 which identify the time slots of the five tones which form the code When a valid tone of the code to be detected is received, one of the tone period elements 130 to 141 produces a logic "0" level on its respective output line 160 to 171 (FIG. 3B). This will cause one or more of the inputs on lines 180, 181, 182 and 183 to change to a logic "1" level, which causes gate 210 to have a logic "0" level output and gate 212 to have a logic "1" level output. The "1" level on line 214 connected to the output of gate 212 sets flip-flop 215 so that the output thereof on line 185 goes to a "1" level. The "1" level on line 214 also clocks the ring counter stages 220, 221 and 222 so that outputs 225, 231 and 232 thereof are driven to logic "1" levels, and outputs 226, 227 and 230 are set at logic "0" levels. This pattern of output levels from the flip-flops 220, 221 and 222 causes the output of NAND gate 235 to go to a "0" level, while the outputs of the other gates 236 to 239 remain at a "1" level. The "0" level on line 240 connected to the output of gate 235 indicates that the first tone of the code has been received and that one of the tone period elements 130 to 141 has responded to this tone as a valid tone.

Line 185 from control flip-flop 215 extends to the control logic circuit 14 (FIG. 3D) and is connected to one input of AND gate 250 thereof. Shift register 252 has eight stages, with the eighth stage being connected to the second input of AND gate 250. The shift register is enabled by the "1" level on line 78 when the period counter 24 is not counting, as has been described. This allows the clock pulses on line 50 to shift logic "1's" into the register, and when eight pulses have been applied (8 microseconds) the register 252 produces a "1" level on line 251. The logic "1" level on line 185 together with the "1" level on line 251 from shift register 252 produce a "1" level on output line 253 from gate 250 which acts to set flip-flop 254. This causes the output of the flip-flop 254 on line 75 to change from a "1" level to a "0" level and the output on line 255 to go to a "1" level. Line 75 extends to the period timing gate 23 and the "0" level thereon acts to terminate the period timing sequence. The various components of the decoder are reset as required to prepare for the selection operation on the next tone. This will be described further with the description of the logic control circuit 14.

Seventy milliseconds after the phase locked loop 10 is first locked, and a "1" level is applied to line 68, the control logic circuit 14 generates a pulse on line 186 to provide a "1" level thereon to reset flip-flop 215 so that the output on line 185 returns to the logic "0" level. This conditions the decoder for reception of the second tone of the five tone code.

If a valid tone is received for the second tone, some of the output lines 180 to 183 from the tone selector encoder 38 will again change state following the fifth successful period measurement of the second tone. Gate 210 will therefore provide a logic "0" level output which is applied to gate 212, and this will provide a "1" level on line 214. This will again set control flip-flop 215, and will advance the ring counter so that outputs 225, 226 and 232 are at logic "1" levels and outputs 230, 231 and 227 are at "0" levels. These levels at the outputs of the ring counter will cause gate 236 to have a "0" level output while gates 235, 237, 238 and 239 have "1" level outputs. The "0" level output of gate 236 on line 241 indicates that the second tone has been decoded. Again, seventy milliseconds after the loop has locked on the second tone, control flip-flop 215 and the period timing gate 23 are reset in preparation for decoding the third tone. The ring counter formed by flip-flops 220, 221 and 222 is advanced as previously described each time a valid tone is detected within seventy milliseconds after the loop is locked on the tone. Thus on reception of the third tone, the ring counter outputs cause the output of gate 237 to have a "0" level while the other gates have "1" level outputs. The "0" level on line 242 indicates that the third tone has been decoded.

The action of the decoder on the fourth and fifth tones of the five tone code will continue in the same manner. When the fourth tone has been decoded, gate 238 will provide a "0" level on line 243, and when the fifth tone has been decoded, gate 239 will provide a "0" level on line 244.

As previously stated, the logic control circuit 14 controls the other elements of the decoder, and if a valid tone is not received within seventy milliseconds after the phase locked loop 10 is locked on a received tone, the control circuit 14 acts to reset the period counter 24, period count selector, code plug interface circuit 26 and code plug 27 so that they are in condition to begin decoding from the first time slot of the code. The code plug interface circuit is reset by the momentary application of a "1" level to line 189 from the logic control circuit 14, and this sets the flip-flops 220, 221 and 222 of the ring counter to their initial states. Accordingly, the next output signal from tone selector encoder 38 advances the counter to the first time slot.

In the preceding description, the term "valid tone" means one of the 12 tones to which the twelve tone period elements 130 to 141 of the tone selector circuit 29 responds. This does not mean that this is one of the tones to which the particular decoder will respond, or that it is received in the correct time slot for this tone. The action to respond to the preset tones in the correct time slots will be described.

Although reference has been made to action of the logic control circuit 14, and certain parts thereof have been described, the operation of the logic control circuit 14 will be further described after the complete decoding sequence has been outlined. It is believed that this will facilitate the description of the logic control circuit.

The code plug circuit 27 (FIG. 3C) includes the code memory 250, which stores the tone sequence to which the decoder will respond, the comparison circuit 252, that compares the received tone sequence with the tone sequence stored in the memory, and a group call decoder 254. The code memory 250 can be a known programmable read only memory (P-ROM) which has five input lines 256, 257, 258, 259 and 260, and four output lines 261, 262, 263 and 264. The memory in effect has five sections, each coupled to one input line, and when each input line is selected the memory provides a programmed output on the four output lines. That is, when each input line is selected, the binary number identifying one tone is read out on lines 261–264.

The code memory 250 may include transistors having input electrodes connected to an input line and output electrodes connected together and to an output line, and resistors which function as fuses and which can be selectively fused or blown to form an open circuit to program the memory. This structure is a simple form of the memory shown in FIG. 5 and is known in the art.

For application in the decoder system described, it has been found advantageous to provide a code memory in which the output of each memory section is the one's compliment of the binary number for the tone represented by that section. This facilitates the programming of the code memory by available equipment. The resulting code is an inversion of the code for the tone; that is the binary "1's" are replaced by "0's", and the "0's" are replaced by "1's".

Input line 256 of the code memory 250 is the input for the first time slot, and is connected to output 240 of the code plug interface circuit 26 by inverter 265. As previously stated, when the first tone is detected, line 240 goes to a logic "0" level, and the inverter 265 will apply a logic "1" level to the input line 256. The code memory 250 will then produce binary outputs on lines 261 to 264 which identify the first tone of the code to which the decoder is to respond. If the first tone to be received is tone No. 1, the binary outputs on lines 261 to 264 will be 1110, as the normal binary number 0001 has been inverted.

The four outputs 261 to 264 of the memory 250 are connected respectively to inputs of four exclusive OR gates 270, 271, 272 and 273. The four output lines from the tone selector encoder 38 are connected through inverters to second inputs of the gates 270 to 273, with line 180 being connected through inverter 275 to gate 270, line 181 being connected through inverter 276 to gate 271, line 182 being connected through inverter 277 to gate 272, and line 183 being connected through inverter 278 to gate 273. The exclusive OR gates 270 to 273 form a comparator, and the memory 250 and encoder 38 are connected thereto so that the most significant digits of the stored tone and the received tone are applied to gate 273. The next most significant digits are applied to gate 272 and then to gate 271, and the least most significant digits are applied to gate 270.

As the tone is stored in the memory 250 in a one's compliment or inverted form, the binary outputs from the selector encoder 38 are applied through inverters so that these outputs are also inverted and the two inputs to each exclusive OR gate will be the same when the tone received is the tone stored in the memory. The gates 270 to 273 each provide a "1" level output if the two inputs thereto are different and a "0" level output if the inputs are the same. The outputs of gates 270 to 273 are connected to NOR gate 275, and when the outputs of gates 270 to 273 are all "0's", indicating that the two inputs to each gate are the same, the output of NOR gate 275 will be at a "1" level. This indicates that the tone received during the first time slot is the same as the tone stored in the first section of the memory 250.

When the tone in the second time slot is detected, the output from the interface circuit 26 on line 241 goes to a logic "0" level, and this causes the inverter 266 to apply a logic "1" level to input line 257 of the code memory 250. This will activate the second section of the memory and the second tone stored therein will be read out as a binary output on lines 261 to 264. This binary output will be compared with the binary output for the tone received during the second time slot, which is applied from tone selector encoder 38 through inverters 275 to 278 to the exclusive OR gates 270 to 273. If the tones correspond, all the outputs of the gates will be "0's", and the output of the NOR gate 275 will be at a "1" level.

The same action takes place during the third, fourth and fifth time slots, with line 242 acting through inverter 267 to activate input line 258 of the memory 250, and lines 243 and 244 acting through inverters 268 and 269 to activate input lines 259 and 260, respectively. The binary outputs of the memory for each time slot are compared with the binary outputs of encoder 38, and the output of NOR gate 275 indicates when the binary outputs correspond.

In the above description the memory 250 has provided a one's compliment or inverted binary output, but it will be apparent that a memory providing a direct output could also be used. In such case the inverters 275 and 278 would not be used, and the binary output from the tone selector encoder 38 on lines 180 to 183 would be directly applied to the exclusive OR gates 270 to 273.

The output of NOR gate 275 is applied to one input of NOR gate 276, and line 190 from the logic control circuit 14 is connected to a second input of this gate. The output of gate 276 is connected to the set input of flip-flop 278, and line 189 from logic control circuit 14 is connected to the reset input thereof. The output of flip-flop 278 is connected to one input of NOR gate 280, the output of which is applied on line 187 to the logic control circuit 14. The flip-flop 278 provides a memory function to keep track of whether the tone received in each time slot corresponds to the tone stored in the memory 250.

At the end of a decode sequence, the control circuit 14 applies a pulse to line 189 that momentarily raises this line to a logic "1" level. This pulse resets the flip-flop 278 so that the output line 279 therefrom is at a logic "0" level. Line 279 remains at a "0" level as a new decoding sequence begins, as long as the received tones correspond to the tones programmed in the code memory 250. When the first tone is received, the tone selector encoder 38 applies a binary signal representing the particular tone on lines 180 to 183 and causes the interface circuit 26 to activate line 240 which identifies the first time slot. This causes memory 250 to read out the binary signal representing the tone stored in the first section of the memory, and the two binary signals are compared by exclusive OR gates 270 to 273. When the two binary signals agree exactly, the output of gate 275 assumes a logic "1" level. If the two signals do not agree exactly, the output of gate 275 is at a logic "0" level.

A short time after a tone has been detected, the logic control circuit 14 pulses line 190 to a "0" level, from its normal "1" level. The "1" level normally applied to NOR gate 276 holds the output of this gate to a logic "0" level. However, during the pulse when the line 190 goes to the "0" level, the output of gate 276 will remain at the "0" level only if the output of gate 275 is at a logic "1" level. Further, the output of flip-flop 278 will remain at a "0" level as long as the output of gate 276 remains at a "0" level. If gate 276 produces a "1" level output, the flip-flop 278 will be set to produce a "1" level output.

The above operation causes the flip-flop 278 to be reset and produce a "0" level on line 279, which will remain at a "0" level as long as the received tones correspond to the tones programmed in the memory 250 for each time slot. If the received tone for any time slot differs from the tone in memory 250, the output of NOR gate 275 will fall to the "0" level. This will cause the gate 276 to produce a "1" level output on line 277 when the pulse ("0" level) is applied by line 190 to this gate. The "1" level on line 277 will set flip-flop 278 so that its output on line 279 rises to a "1" level, and the flip-flop is latched to hold the "1" level for the duration of the decoding sequence.

At the end of the decoding sequence, after the five tones have been received, the output of the memory flip-flop 278 is sampled, and if it is at a "0" level, the received tone sequence corresponds exactly to the tone sequence stored in code memory 250. If the output on line 279 from the flip-flop 278 is at a "1" level, the received tone sequence is not the correct tone code. The flip-flop 278 is sampled by action of NOR gate 280 and NAND gate 282. Line 260 from inverter 269, which identifies the fifth time slot, is connected to one input of gate 282, and line 191 from the logic control circuit 14 is connected to a second input. After the fifth tone has been decoded, line 260 goes to a logic "1" level, and line 191 is momentarily driven to a logic "1" level. These inputs cause the output of gate 282 on line 283 to change from its normal "1" level to a "0" level. The normal "1" level on line 283 has held the output of gate 280 to a "0" level, but when line 283 goes to the "0" level, the output of gate 280 is determined by the state of flip-flop 278 and the resulting level on line 279. If line 279 is at a "0" level at this time, the output of gate 280 which is applied to line 187 goes to a "1" level indicating that a correct tone sequence has been received. However, if line 279 is at a "1" level when line 283 is strobed to a "0" level, the output of gate 280 which is applied to line 187 remains at a "0" level indicating that the tone sequence received was not a correct tone code. Line 187 is connected to the logic control circuit 14 and applies information thereto as to whether the received tone sequence was correct.

As previously stated, the code plug circuit 27 also includes a group call circuit 254. Each decoder is assigned a unique five tone code to which it responds, as has been described. In addition, it may be desired to alert a group of users of equipment having the decoders, and a group call provision is included to accomplish this. The group call which may be used includes at least the first two tones of the unique call for the decoder, followed by tone No. 11, and with the remaining tones of a five tone group call being provided by either tone No. 11 or tone No. 12. The group call can include the first four tones of the unique call followed by tone No. 11, or only two or three tones of the unique call followed by tone No. 11. As previously stated, tone period elements 140 and 141 of the period count selector 25 respond to tones No. 11 and No. 12.

The group call circuit 254 is formed by three main functional sections, the first including memory flip-flop 285 and memory sampling gate 287. The second section includes the latching array formed by inverters 290 and 292, NAND gate 294 and NOR gates 296, 298, 300 and 302. This circuit controls the initial setting of flip-flop 285 by requiring that the first two or more tones received match the tones stored in the code memory. The third section of group call circuit 254 includes a gate array, including NAND gates 304, 308 and 310 and inverters 312 and 314, connected to the output lines 180 to 183 from the tone selector encoder 38, that sets the memory flip-flop 285 to the invalid state if a received tone does not conform to the group call format.

Considering now the operation of the group call circuit 254, the reset pulse from the logic control circuit 14 momentarily raises line 189 to a logic "1" level, and this is applied through diode 316 to the flip-flop 285 so that the output thereof on line 286 goes to a "1" level. The pulse on line 189, together with the "0" level that normally appears on line 277, initialize gates 298, 300 and 302 so that line 299 at the output of gate 298 goes to a "0" level, line 301 at the output of gate 300 goes to a "0" level (by action of inverter 292), and line 303 at the output of gate 302 goes to a "1" level. When the "1" level is removed from line 189, line 299 remains at a "0" level because of the "1" level on line 303. Gates 298 and 302 form an R-S flip-flop, and the conditions set up by the initialization remain until they are altered by other circuit elements.

The "0" level on line 299 is applied to NOR gate 296 and causes the condition of gate 296 to be determined by the second input thereto on line 295 from gate 294. Thus, the inputs to gate 294 control the state of line 297 connected to the output of gate 296. The inputs to gate 294 are the set input to memory flip-flop 278 on line 277; the output of gate 288, which is connected to the lines 242, 243 and 244 designating the third, fourth and fifth time slots, which is provided on line 289 to gate 294; and the output of inverter 290, the input to which is connected by line 305 to the output of NAND gate 304, to which the tone selector encoder 38 outputs on lines 180 to 183 are applied. This gate arrangement applies a momentary reset pulse on line 297 that resets the flip-flop 285 to the "0" state, which indicates a valid group call when the first two, three or four tones of a received tone sequence agree with the tones stored in the memory 250, and the first tone which differs from the tone in the memory is the group or eleventh tone.

Three inputs of gate 304 of the gate array are connected directly to lines 180, 181 and 183 from the tone selector encoder 38, and the fourth input is connected to line 182 through inverter 312. Thus, the output of gate 304 will be zero when lines 180 to 183 are at logic "1", "1", "0" and "1" levels, respectively. This is the binary pattern at the selector output which indicates that tone No. 11, the group tone, has been received. Since input line 291 to gate 294 is connected to line 305 by inverter 290, line 291 will be at a one level only if tone eleven has been decoded in the present time slot. Input line 289 to gate 294, which comes from gate 288, will be at a logic "1" level only during tone time slots three, four and five, since gate 288 is connected to lines 242, 243 and 244 which go low during these time slots. The third input to gate 294 on line 277 is connected to the set input of flip-flop 278 and is at a "1" level only when the gate 276 indicates that the received tone is not the tone programmed in the memory 250. Accordingly, if the received tone departs from the tone in the memory during the third, fourth or fifth time slot, and if the received tone is tone No. 11, all the inputs to gate 294 are simultaneously at the "1" level and the output of gate 294 on line 295 goes to a "0" level. This causes gate 296 to apply a "1" level to line 297 which resets flip-flop 285 so that a "0" level is applied at output line 286.

Shortly after the set input on line 277 goes to a "1" level, the flip-flop formed by gates 298 and 302 is set, and the reset signal on line 299 is removed. This results as the output of inverter 292 on line 293 goes to the "0" level, and this together with the initial "0" level on line 299 applied to gate 300 causes the output thereof on line 301 to go to a "1" level. This in turn drives line 303 at the output of gate 302 to a "0" level, which together with the "0" level on line 189 causes the output of gate 298 on line 299 to rise to a "1" level. The "1" level on line 299 drives the output of gate 300 on line 301 to a "0" level, but the output of gate 302 is held to the "0" level by the "1" level on line 299. Accordingly, the flip-flop formed by gates 298 and 302 is latched when line 299 is at the "1" level, and it remains latched or set until a reset pulse is applied thereto by the control logic circuit 14.

The latching of the flip-flop formed by gates 298 and 302 acts to clamp line 297 at the "0" level, since a "1" level on line 299 holds the output of gate 296 at the "0" level. Because of the gate delays involved, line 297 is held clamped a short time after an output on line 295 is generated by a proper group call tone sequence. Thus, line 297 can be driven high by a "0" level on line 295 before the "1" level appears on line 299 and resets line 297 to a "0" level.

If the set input line 277 from gate 276 goes to a "1" level during the first or second tone slots indicating that the tone stored in memory 250 is not received, or if the decoded tone is not tone No. 11 when line 277 goes to the "1" level, the flip-flop including gates 298 and 302 latches line 297 to a "0" level without allowing it to first go to the "1" level. This is because the inputs to gate 294 are not all "1's" so that its output remains at the "1" level and the reset pulse is not generated by gate 296 and applied on line 297 to flip-flop 285. In such case the memory flip-flop 285 is in the set condition, which indicates that the tone sequence is not a proper group call.

If the memory flip-flop 285 is reset to zero, and a proper group call formed by two or more initial tones which are the tones programmed in the memory 250 are received, followed by tone No. 11, and the remaining tones in the five tone sequence received are either tone No. 11 or tone No. 12, the flip-flop 285 remains reset. As previously stated, when tone No. 11 is received, the output of NAND gate 304 goes to a "0" level. NAND gate 308 has inputs connected to lines 182 and 183 from encoder 38 and produces a "0" level on its output line 309 when tone No. 12 is received. The outputs of gates 304 and 308 are applied to NAND gate 310, which has a third input connected to line 190 from the logic control circuit 14 through inverter 306. Thus, when line 190 goes to the "0" level at the end of a tone decoding cycle, the output of inverter 306 goes to the "1" level, and one of the outputs of gates 304 and 308 (lines 305 and 309) must be "0" to keep the output of gate 310 from going to the "0" level.

If the output of gate 310 (line 311) goes to the "0" level, inverter 314 will apply a "1" level on line 317, which is applied through diode 318 to flip-flop 285 to set the same so that the output on line 286 goes to the "1" level to indicate an invalid tone sequence. However, if the tone received is tone No. 11 or tone No. 12, the output of gate 304 or gate 308 will go to the "0" level so that one input to gate 310 remains at the "0" level and the output remains at the "1" level, and the flip-flop 285 will remain reset. Thus after the memory flip-flop 285 has been reset to provide a "0" level on line 286 by two or more correct unique tones followed by the group call tone (tone No. 11), the flip-flop 285 will remain reset if the tones which follow are either tone No. 11 or No. 12, to thereby indicate a valid group call.

The state of the group call memory flip-flop 285 is examined at the end of a decoding sequence in the same way that memory flip-flop 278 is examined for a unique or normal call. When line 283 goes to "0" at the end of a five tone sequence, this input to gate 287 causes the output of this gate to go to a "1" level if the flip-flop 285 is reset by a valid group call and provides a "0" level on line 286. If flip-flop 285 is set by an invalid tone sequence and provides a "1" level on line 286, the output of gate 287 remains at the "0" level. The output of gate 287 is applied to line 188 which is connected to the logic control circuit 14.

Although portions of the logic control circuit 14 have been described in the above, the basic circuit operation will now be described in connection with FIG. 3D. The logic control circuit is responsive to the signal on line 68 from the lock indicator 34 (FIG. 2) and receives timing pulses from the timing counter 22 (FIG. 3A). The logic control circuit generates appropriate reset and sampling pulses which prepare the digital circuits for decoding and/or transfer of information from one element to another. It samples the code plug memories (278 and 285) and finally produces appropriate alerting signals when valid unique or group tone code sequences have been decoded.

The time base signals which determine the time slots for the tones of the codes are produced by a digital loop including AND gate 320, shift register 322 and NOR gates 324, 326, 328 and 333 (FIG. 3D). The AND gate 320 has six inputs connected to output lines 53, 54, 55, 56, 58 and 60 from the timing counter 22. These lines are connected to the fifth, sixth, seventh, ninth, thirteenth and seventeenth stages of the timing counter, respectively. The output of gate 320 is connected to the reset input (line 321) of the eight stage shift register 322. The output of the third stage of the shift register 322 on line 323 and the output of gate 324 on line 325 are both coupled to one input of gate 330, with line 325 being coupled through diode 336 and line 337 to the junction between resistors 332 and 334 which connect the shift register output line 323 to the input of gate 330. The clock input to the shift register is connected directly to line 50, which is connected to the output of the clock oscillator 21 (FIG. 3A).

The clock pulses are applied to the timing counter 22 (FIG. 3A) by line 51 to which the clock pulses on line 50 are selectively applied by gate 328. Gate 328 is controlled by gate 326, being connected to the output 327 thereof by resistors 338 and 339. Gates 324 and 326 are cross coupled in a flip-flop configuration, with the output of each gate coupled to one input of the other. Line 68 from the lock indicator is connected to one input of gate 326, and line 340 is connected to one input of gate 324 to control the flip-flop. When the phase locked loop 10 is not locked, line 68 is at a logic "0" level. The level of line 340 is controlled by gate 342 which has one input connected to line 185 from the code plug interface circuit 25 (FIG. 3C). Line 185 is at the "0" level at the beginning of a decoding sequence and this causes line 340 to be at a logic "1" level. The inputs on lines 68 and 340 cause the output of gate 326 on line 327 to be at the "1" level, and the output of gate 324 on line 325 to be at the "0" level. The "0" level on line 325 is coupled through diode 336 to provide a "0" level on line 337, and this is applied to gate 330 with the normal "0" level on line 72. These inputs to gate 330 causes the output thereof to go to a "1" level, which is applied to line 52 which extends to the timing counter 22 to reset the same so that all the stages thereof are in the "0" state.

The resetting of the timing counter 22 provides "0" level signals on all the outputs thereof that are connected to the AND gate 320, so that the output thereof on line 321 is at a "0" level. This "0" level is applied to the reset input of shift register 322 so that clock pulses applied thereto on line 50 causes the stages of the register to change state, and after eight clock pulses the eight stages of the shift register all contain "1's". As the oscillator 21 operates at one MHz, the time period for eight pulses will be 8 microseconds.

When the phase locked loop 10 locks to an input tone signal, line 68 goes to a logic "1" level and line 340 goes to a "0" level. The "1" level on line 68 causes gate 326 to provide a "0" level on line 327, which is combined with the "0" level on line 340 by gate 324 to drive line 325 to a logic "1" level. Diode 336 acts to disconnect line 337 under this condition so that the level on line 337 is determined by the "1" level appearing at the output line 323 of shift register 322, and the output of gate 330 appearing on line 52 is at a "0" level. This removes the forced reset condition from the period counter 24, and the "0" level on line 327 allows the output of gate 328 to swing between "0" and "1" levels in accordance with the clock pulses on line 50. Thus when the phase locked loop 10 first locks, and the decoder is in a reset condition, the clock pulses are applied to line 51 which extends to the timing counter 22 which begins counting up from the all zero state.

After the timing counter 22 starts to count, the count will continue until the timing sequence is terminated, which can take place in three ways. First, the loop loses lock before a valid tone is detected; second, a valid tone is detected before the tone slot time limit is reached; or third, the phase lock loop remains locked until the time-out is reached before decoding a valid tone. In the first case, the counting action starts as set forth above. When the loop loses lock, line 68 returns to a "0" level, and since a valid system tone has not been detected, line 185 is also at a "0" level so that line 340 reverts to a "1" level. Thus the levels on lines 68 and 340 cause the digital loop to revert to the reset condition which resets the timing counter 22 to the all zero state.

In the second case, the timing sequence is terminated when line 185 is driven to a logic "1" level in response to the detection of a tone. This "1" level causes the output of gate 342 on line 340 to go to a "0" level, and this, with the "0" level on line 327 resulting from the "1" level on line 68 applied to gate 326, causes the output of gate 324 on line 325 to rise to a "1" level. This latches gate 326 so that its output remains at the "0" level independent of the level on line 68, so that the timing counter 22 continues to count regardless of the state of lock indicator 34. When the counter reaches a count of 70,000, corresponding to an interval of 70 milliseconds, output lines 53, 54, 55, 56, 58 and 60 of the counter all are at the "1" level simultaneously, and will remain at this level for the next fifteen clock pulses. This causes all of the inputs to gate 320 to be at the "1" level and the output thereof on line 321 goes to a logic "1" level. This resets shift register 322 and drives the output on line 323 to a "0" level so that the output of gate 330 on line 52 is at a "1" level. This resets the timing counter 22 so that the outputs thereof applied to gate 320 are all "0" and the output thereof on line 321 goes to "0" removing the reset condition of the shift register. Then after three clock pulses the output 323 of shift register 322 goes to a "1" level, and after four more pulses output 344 thereof goes to a "1" level while output 345 remains at the "0" level. The output on line 345 is inverted by inverter 346 so that both inputs to gate 348 are "1's" and its output on line 349 is at a "0" level. This level acts through inverter 350 to drive line 186 to a "1" level. This forms the reset pulse which resets control flip-flop 215 of the code plug interface circuit 26 (FIG. 3C). This reset pulse lasts for one clock period, after which the output 345 of the shift register 322 rises to a "1" level so that the output of gate 348 on line 349 goes to a "1" level, and the output of gate 350 on line 186 goes to a "0" level. This reset action causes flip-flop 215 to provide a "0" level on line 185 so that gate 342 is controlled by the lock signal on line 68. The system is then free to lock on the second tone and thereby continue the decoding sequence.

In the third case, the timing loop continues as described above, and when the count reaches 70,000 the timing counter 22 is reset, and the decoder begins the timing sequence again. That is, as long as the loop is locked, the decoder attempts to decode the signal, and after 70 milliseconds the timing counter is reset and reset pulses are applied to the decoder.

The circuitry in the logic control circuit 14 which controls reset lines 142 and 143 for the period elements of the point count selector 25 has been described. This includes the gates 200 and 205 and the associated circuitry shown in FIG. 3D. The reset pulses applied to line 144, which reset the binary counters (154) of the tone period elements 130 to 141, are provided by the tone slot timing loop which has been described, together with gate 352 and inverter 354. As has been stated, the output of gate 342 on line 340 is at the "0" level only if the phase locked loop is locked, or if a valid tone has been detected. Line 52 is at the "1" level only when the timing counter 22 is being reset. Lines 52 and 340 are the inputs to NOR gate 352, and the output of this gate on line 353 is at the "0" level if the timing counter is being reset (lines 52 at "1" level) or if the loop loses lock and a valid tone has not been detected (line 340 at a "1" level). This "0" level is inverted by inverter 354 to place a "1" level on line 144 under these conditions to reset the binary counters of the time period elements.

The logic control circuit 14 also generates a reset pulse for the code plug interface circuit 26 and the code plug circuit 27 which is applied to these circuits by line 189. This reset pulse acts to initialize the ring counter of the interface circuit 26 and the memory flip-flops 278 and 285. The lock indicator line 68, the valid tone detect line 185 and the period counter reset line 52 are inputs to three NOR gates 342, 356 and 358, with the signal on line 52 being inverted by inverter 355. The action of gate 342 has previously been described, and the output line 340 therefrom is at the "0" level if the loop is locked or if a valid tone has been detected. The output 357 of gate 356 is at the "0" level if the valid tone detect line 185 is at the "1" level, or if reset line 52 is at the "0" level and the inverter 355 applies a "1" level thereto. The output 359 of gate 358 is at the "0" level if the lock indicator line 68 is at a "1" level or if the output of inverter 355 is at a "1" level. Lines 340, 357 and 359 are the inputs to NOR gate 360, and the output of this gate is at a "1" level only if all three input lines are at the "0"

level. Inverter 362 inverts this output, which appears on line 361, so that line 189 is at a "1" level if any of the following events occur:

(a) the phase locked loop loses lock before a valid tone has been detected;

(b) the timing counter is reset before a valid tone has been detected; or (c) the loop is not locked when the timing counter is reset.

The last of the above requirements is tied into the specific operating mode of the phase locked loop 10 (FIG. 2). This loop may be adaptive in that it can be made to have a wide bandwidth when the loop is unlocked so that the VCO 32 can change frequency quickly to lock on the incoming tone signals, and a narrowed bandwidth when the loop is locked to improve the signal to noise ratio of the waveform produced by the VCO 32. This operation is known in the art. The bandwidth control is provided by gates 70 and 368, and inverter 365. When the loop is unlocked, the lock indicator line 68 is at the "0" level and the output of gate 70, which is applied by line 85 to the loop 10, is at a "1" level which places the loop in its wide band state. When the loop locks and line 68 goes go the "1" level, this signal with the signal from NAND gate 368, which is also at the "1" level, causes the output of gate 70 to go to the "0" level and this places the loop 10 in its narrow band state. Line 85 can be connected to filter 31 in the phase locked loop to control the bandwidth of the loop in a well known manner. Gate 368 receives one input from the timing counter 22 through line 60 and inverter 365 and a second input from the tone detect line 185. When a valid tone is detected, line 185 goes to a "1" level and this causes the output of gate 368 on line 71 to go to the "0" level which forces the output of gate 70 to the "1" or wide band level. Also, the output on line 60 goes to the "1" level 65.536 milliseconds after the loop is locked causing the inverter 365 to apply a "0" level to gate 368 and a "1" level on line 71. If the loop is locked at this time, the "0" level applied by gate 70 to line 85 causes the loop to go to the narrow band state.

The remaining parts of the logic control circuit 14 generate control pulses on lines 190 and 191 which cause the code plug circuit 27 to compare the decoded tones with the tones stored in the code memory, interrogate the code plug memories after each period measurement, monitor the output lines 187 and 188 from the memories and generate alerting signals when a valid unique or group call is decoded.

The action of shift register 252, AND gate 250 and flip-flop 254 to respond to a "1" level on line 78 from the period timing gate 23 (FIG. 3A), and a "1" level on line 185, to provide a "0" level on line 75 to cause the period counter 24 to start counting has been described in connection with the operation of the code plug interface circuit 26. These elements cooperate with NAND gate 370, AND gate 372 and the associated elements to produce the pulses on lines 190 and 191.

Gate 370 produces a "0" level at its output, which is applied to line 190, during the sixteenth, seventeenth and eighteenth pulses counted by period counter 24, due to the connection of lines 174 to 178 to outputs of decoders 112 and 114 (FIG. 3B). Lines 174 and 178 are at "1" levels after sixteen pulses, lines 175 and 178 are at "1" levels after seventeen pulses and lines 176 and 178 are at "1" levels after eighteen pulses have been counted. Thus, for the duration of these three clock periods after line 75 goes to the "0" level, input lines 371 (from lines 174, 175 and 176), 178 and 255 to NAND gate 370 are all at "1" levels and this gate applies a "0" level to line 190. Line 255 from flip-flop 254 goes to the "1" level when line 75 therefrom goes to the "0" level after detection of a valid tone to provide the compare pulse for the code plug circuit 27 (FIG. 3C), as has been described.

On the nineteenth clock pulse after line 75 goes to "0" level, lines 177 and 178 from the period count decoder 28 are simultaneously at the "1" level and these lines are connected to AND gate 372 so that its output goes to the "1" level. This output is applied to line 191, which is connected to gate 282 in the code plug circuit 27, and by line 191 to flip-flop 254 to reset the same so that output line 75 thereof is driven to the "1" level and line 255 is driven to the "0" level. If the ring counter (220, 221 and 222) of the code plug interface circuit 26 is in the time slot five state, input line 260 to gate 282 is at the "1" level, and this gate produces a "0" level output on line 283 that samples the state of code plug memories 278 and 285. This will produce a "1" level on line 187 if a valid unique tone code has been detected, or a "1" level on line 188 if a valid group tone code has been detected.

The logic control circuit 14 also provides alert signals when a valid unique tone code or a valid group tone code has been detected. To provide an alert signal for a unique or normal code, the one level on line 187 is applied to NOR gate 392 of the logic control circuit 14 and causes this gate to have a "0" level output on line 393. This line and line 61 from the timing counter 22 are the inputs to NOR gate 390. Line 61 is normally at a "0" level and goes to a "1" level at a time interval of 1.048 second. Thus, when line 393 goes to the "0" level, the output of gate 390 on line 72 goes to a "1" level. This "1" level on line 72 is applied to gate 330 and forces the output thereof on line 52 to be at the "0" level. This prevents the timing counter 22 from being reset by the input to gate 330 on line 335. The "1" level on line 72 also acts to clamp the output of gate 73 of the period timing gate 23 (FIG. 3A) to "0" level to set the flip-flop 66 thereof. The "1" level on line 72 also goes to one input of gate 392 to latch the output thereof on line 393 to a "0" level. This is applied through diode 396 and brings line 395 to the "0" level. This is applied to gate 328 together with the clock pulses on line 50 so that the output of gate 328 is determined by the clock pulses. The period counter 24 is held in the count mode until the flip-flop formed by gates 390 and 392 is unlatched.

During the counting period, the timing counter 22 output line 59 controls gate 380, which also receives an input from line 393. Since line 393 is at the "0" level, the alternate "0" and "1" pulses of 8.192 milliseconds duration that appear on line 59 cause gate 380 to produce a square wave form output having a frequency of 61 Hz. Since group call line 188 is at the "0" level, line 387 is also at a "0" level so that the square wave output of gate 380 is applied through gate 382 and appears on line 383. The signal on line 57 from timing counter is also a digital square wave with alternate levels of 0.512 milliseconds duration (976 Hz repetition rate). Thus the output of gate 384 to which lines 383 and 57 are applied is a combination of the two square waves and consists of alternate periods of "0" level of 8.192 milliseconds duration followed by a 8.192 milliseconds period of the 976 Hz square wave. This is applied to output line 400 and forms the normal or unique alert tone output signal.

This alert tone signal lasts until line 61 goes to a "1" level 1.048 seconds after the timing counter 22 started counting, which terminates the alert tone signal. The "1" level on line 61 acts through gate 390 to force line 72 to a "0" level, and this acts through gate 392 to bring line 393 to the "1" level since line 187 is at a "0" level at this time. The "0" level on line 72 acts to reset the timing counter 22 so that a reset is generated within 70 milliseconds. The "1" level on line 393 removes the forced "0" level from line 395 so that control of the timing counter 22 is returned to the lock indicator line 68 and line 340, which is controlled by tone detect line 185, and brings line 381 to a "0" level. The simultaneous "0" levels on lines 381 and 387 brings line 383 to a "1" level, which in turn causes gate 384 to bring line 400 to a "0" level, thus terminating the unique call alert tone signal.

For a group call, the alert tone sequence is similar to the sequence described for a unique call. However, line 188 is now at the one level which acts through gate 388 to bring line 389 to the "0" level, through gate 392 to bring line 393 to the "0" level. This, in turn, forces lines 387 and 72 to "1" levels. The "1" level on line 72 prevents the period counter 24 from being reset and locks it in a count mode. The "1" level on line 387 is applied back to the input of gate 388, latching output line 389 to "0" and line 387 to a "1" level as long as line 61 is at a "0" level. The "1" level on line 387 brings the output 383 of gate 382 to a "0" level so that the output of gate 384 is determined by line 57. Since this line is changing between "1" and "0" levels at a 976 Hz rate, as has been described, the output at line 400 is a 976 Hz square wave. Thus the group call alert signal differs from the unique call alert signal.

When line 61 goes to the "1" level, line 387 from gate 386 and line 72 from gate 390 are driven to "0" levels. As has been described, this returns control of the timing counter 22 to the lock indicator line 68 and the tone detect line 185, and allows for the 70 milliseconds reset intervals. The zero level on line 387 also removes the latch from the flip-flop formed by gates 386 and 388. The "0" level on line 387 together with the "0" level on line 381 forces line 383 to a "1" level, and this acts through gate 384 to bring output line 400 back to its normal "0" level, ending the alert signal for a group call.

The implementation of the digital tone decoder system which has been described is particularly suitable for use in a signalling system operating with multi-tone sequential codes which are made up of a relatively small number of different tone frequencies. As a separate tone period element (130-141) is required for each tone frequency, the equipment required for a system using a large number of tone frequencies may be objectionably expensive. However, the basic decoder system is applicable for use with a code wherein a much larger number of tone frequencies is used, as the period counter 24 can provide a measure of many different frequencies. For example, eighty or more different tone frequencies can be used.

A decoder system is illustrated in FIG. 4 which may be more suitable for a signalling system using many different tone frequencies as it does not require the tone period elements, and the code memory itself defines the period limits of the tones to which the decoder system responds. Although this system requires a more complex code memory, the decoder system as a whole may be less complicated and expensive when used in certain applications. The system of FIG. 4 utilizes the phase locked loop 10, the timing circuit 11, the period timing gate 23, the period counter 24 and the logic control circuit 14 which are illustrated in FIGS. 2, 3A and 3D. The conductors interconnecting the circuits of FIG. 4 to circuits on these drawings are identified by the same reference numerals as on the drawings. The code plug interface circuit of FIG. 4 is identified by numeral 26A, and the code plug circuit is marked 27A, as they are different from the circuits of FIG. 3C. The period count selector 25 of FIG. 3B is changed significantly, with the digital period comparator 500 and associated circuitry forming the period count selector 25A in FIG. 4. The logic control circuit 14 of FIG. 3D can be used with the system of FIG. 4, although parts of this circuit are not required in this system.

The digital period comparator 500 is the heart of the period count selector 25A in the decoder system illustrated by FIG. 4. The output lines 87 to 100 from the period counter 24 (FIG. 3A) apply binary period measurement information from the received tone to a first set of inputs on the left side of the comparator. The code memory 530 applies information as to the period of the tones to be detected to a second set of inputs on the right side of the comparator 500. The comparator 500 compares the binary number represented by the outputs on the fourteen lines 87 to 100 with the binary number represented by the outputs on the fourteen lines 531 to 544 from the code memory 530. The digital period comparator 500 can be a standard fourteen input binary comparator which compares the inputs from the period counter 24 on lines 87 to 100 with the reference inputs from the code memory 530 on lines 531 to 544.

Considering the operation of the period count selector 25A, at the end of a period measurement the logic control circuit 14 provides a logic "1" level on line 143. This is applied to AND gate 502 which receives a second input from line 501 from the flip-flop 504. Reset line 142 from logic control circuit 14 is connected to the reset input of flip-flop 504 and resets the same at the start of the period measurement so that line 501 is at the logic "1" level. The "1" levels on lines 143 and 501 cause the output of AND gate 502 to go to the "1" level, and this is applied by line 503 to one input of OR gate 506. This "1" level input drives output line 507 of gate 506 to a "1" level. The comparator is activated by the "1" level applied to the enable input by line 507, and if the two sets of inputs thereto represent the same number, the comparator 500 provides a "1" level on the output 510, which is marked "=". If the number represented by the inputs applied on the left side is higher than the number represented by the reference inputs on the right side of the comparator, a "1" level is produced at the output 511, which is marked ">". Similarly, if the number represented by the inputs applied on the left side is lower than the number represented by the reference inputs, a "1" level is provided at the output 512, which is marked "<".

The code memory 530 is illustrated by FIG. 5 for a five tone sequential signalling scheme of the type previously considered, and is a 14 × 10 array. The array includes a pair of vertical input lines for each code time slot, and fourteen horizontal output lines 531 to 544, which are connected to the digital period comparator 500. When a vertical input line is activated (driven to a "1" level), the output lines will provide a binary pattern in accordance with the programming of the transistor bridging circuits in the memory cells between the input line and the output lines. Each input line is connected through resistors 550 to the base electrodes of a plurality (14) of transistors 551, with the collector electrodes of the transistors each being connected to a different output line. The emitter electrode of each transistor is connected through a fuse resistor 552 to a reference potential. Each of the output lines 531 to 544 is connected to a B+ potential through a resistor 554, so that when a logic "1" level is applied to an input line current flows through the base resistor 550 and causes collector current to flow through load resistor 554. The value of resistor 554 is chosen to limit the current that can flow into the collector electrode of the transistor so that the transistor saturates and provides a "0" level at the collector electrode and at the output line connected thereto. To program the memory, the fuse resistor 552 of a particular bridging circuit can be blown open by applying a programming voltage simultaneously to the input and output lines of a cell of the memory. When the fuse resistor 552 is open, the transistor 551 is effectively disconnected, and the output line rises to a "1" level when the input line is driven to a "1" level. The fuses can be selectively blown so that by driving each input line of the memory, the output lines will provide a particular binary number.

Returning to FIG. 4 and the action of the digital period comparator 500, when the comparator is enabled at the end of a period measurement, and assuming that the tone in the first time slot is being decoded, line 256A will be at the "1" level by action of the code plug interface circuit 26A. Line 505 from flip-flop 504 is at the "0" level as flip-flop 504 is reset (the output on line 505 is the compliment of the output on line 501). These inputs to the code memory 530 provide a "1" level on the first input (vertical) line 560. This results as line 505 is connected through inverter 556 to one input of AND gate 562 to apply a "1" level thereto, and the "1" level on line 256A causes this gate to provide a "1" level on line 560. This will cause the memory 530 to provide the outputs on lines 531 to 544 which have been programmed therein for the lower period limit for the tone to be detected in the first time slot.

When the digital period comparator 500 is enabled, if the measured period is equal to or greater than the lower period limit from the memory 530, either output 510 or 511 of the comparator 500 will be at the logic "1" level. These outputs are applied to OR gate 514 and a "1" level at either output will cause gate 514 to apply a "1" level to the set input of flip-flop 504, so that output 501 thereof drops to the "0" level. This causes the output of AND gate 502 to go to "0" and the output of OR gate 506 to also go to "0" to remove the enable input to comparator 500, so that it is inhibited. The setting of flip-flop 504 causes its output on line 505 to rise to the "1" level, and this is applied to memory 530 to disable input line 560 and enable input line 565. This results as the inverter 556 now applies a "0" level to gate 562, but the "1" level on line 505 is applied to AND gate 564, together with the "1" level on line 256A for the first time slot.

When the input line 565 of the code memory 530 is at the "1" level, the binary number programmed into the memory for the upper period limit for the first tone is read out on lines 531 to 544. After a delay period caused by resistor 516 and capacitor 517, the "1" level on line 505 is applied to line 518, which is connected to the second input of OR gate 506. This causes gate 506 to apply a "1" level on line 507 to the enable input of comparator 500 to initiate a comparing action for the upper period limit. The period measurement is retained by the period counter 24 to permit this second comparing action as the reset of the dividers 83 and 84 is delayed by action of resistor 575, capacitor 576 and diode 577. This delay action is not required in the first embodiment of the invention, and these elements may be eliminated for that embodiment. If the measured period is equal to or less than the upper period limit set in the memory 530, either output 510 or 512 of comparator 500 will rise to the "1" level. These outputs are applied to OR gate 520, and either output will cause OR gate 520 to apply a "1" level to AND gate 522. Line 518 is the second input to AND gate 522, and as this is now at a "1" level gate 522 will apply a "1" level to flip-flop 524 to set the same. Flip-flop 524 had been reset at the beginning of the period measurement by the pulse on line 142 from logic control circuit 14 so that its output on line 525 had been at the "0" level. When flip-flop 524 is now set, line 525 rises to the "1" level.

The setting of flip-flop 524 indicates that the period of the received tone is equal to or greater than the lower period limit programmed in the code memory 530, and equal to or less than the upper period limit programmed therein, so that the tone is correct for the time slot being examined. The "1" level on line 525 from flip-flop 524, is applied to the enable input of counter 526 to advance its count by one, indicating that the correct tone has been decoded.

The decoder system is conditioned for the start of a second period measurement by the application of a reset pulse to line 142 from the logic control circuit 14. This resets flip-flops 504 and 524, and when the next period measurement is complete the pulse on line 143 acts through gates 502 and 506 to enable the comparator 500. If the count applied from period counter 24 is within the limits established by the code memory 530 for the first time slot, the flip-flops 504 and 524 will be set in turn and line 525 will apply a "1" level to counter 526 to again advance the count. The period measurement may be repeated four times, as in the prior embodiment, and if the measured period is within the limits set for all five measurements, the counter 526 will be advanced five times. This will provide "1" levels on counter output lines 527 and 528, which are the "1" and "4" outputs, and which form inputs to NAND gate 529. When both inputs are at "1" levels, the output applied to line 211A will be at the "0" level to indicate that a valid tone has been decoded for the time slot being examined.

The code plug interface circuit 26A is similar to the circuit 26 of FIG. 3C and corresponding parts are identified by the same reference numerals. As there are some differences in the circuits, the suffix A is added to the numerals in circuit 26A shown on FIG. 4. The operation of the ring counter formed by flip-flops 220A, 221A and 222A is modified in FIG. 4 in that reset line 189 from the logic control circuit 14 is connected to the set input of flip-flop 220A, rather than to the reset input. Thus, at the start of a decode sequence, the output 225A of flip-flop 220A is at a "1" level while the outputs 226A and 227A of flip-flops 221A and 222A are at "0" levels. This sets all the inputs to NAND gate 235A at "1" levels so that the output on line 240A is at the "0" level during the first time slot, and the other outputs on lines 241A, 242A, 243A and 244A are all at "1" levels. The "0" level on line 240A is converted to a "1" level on line 256A by inverter 265A and this is coupled to the cells of the code memory which are programmed to the lower and upper limits of the tone to be detected in the first time slot, as has been described.

When the tone in the first time slot has been detected and identified as the correct tone the number of times (5) required to advance counter 526 and provide a "0" level on line 211A, this acts to set control flip-flop 215A and step the ring counter, as was described in connection with FIG. 3C. This causes the output of NAND gate 236A to go to a "0" level, and this level on line 241A acts through inverter 266A to provide a "1" level on line 257A. This is applied in code memory 530 to AND gates 568 and 570 which control the input lines 569 and 571. These input lines control the memory outputs defining the limits of the tone to be detected in the second time slot. When the level on line 505 is at a "0" level at the end of the period measurement, the inverter 556 applies a "1" level to gate 568 so that the level on line 569 rises to a "1". This causes the binary pattern programmed in the cells controlled by input line 569 to be read out on lines 531 to 544 to the comparator 500. If the period count for the received tone is equal to or above the lower limit programmed in the memory 530, the output of OR gate 514 sets flip-flop 504 so that the level on line 505 rises to a "1". This is applied to gate 570 in memory 530 to cause line 571 to rise to a "1" level, and the binary pattern programmed in the cells controlled by line 571 are read out to the comparator. As previously stated, if the period count for the received tone is equal to or below that programmed for the upper limit, OR gate 520 applies a "1" level through AND gate 522 to set the same and apply a pulse to counter 526. This measurement is repeated and if the measured period continues to fall between the programmed limits, the counter 526 is repeatedly advanced until it provides a "0" level on line 211A to step the ring counter of interface circuit 26A and activate the memory 530 to read out the limits programmed for the next time slot.

In the system illustrated in FIG. 4 (as in the system of FIG. 3) five time slots are provided so that the code is formed by five tones applied in sequence. The lines 256A, 257A, 258A, 259A and 260A are driven to a "1" level in sequence to identify the time slots, with the other lines all being at the "0" level. The five lines activate in turn the limits programmed in the memory 530 for the five time slots.

The code plug interface circuit 26A includes a three input NAND gate 245A which has no corresponding part in the circuit 26 of FIG. 3C. When the fifth tone has been found to be the correct one, the "0" level on line 211A acts through gate 212A to step the ring counter so that gate 245A has a "0" level output which is applied through inverter 247A to provide a "1" level on line 248A. This is applied to NAND gate 282A to which the interrogate pulse on line 191 from the logic control circuit 14 is applied. The "1" levels on lines 248A and 191 cause the output of gate 282A on line 283A to be at a "0" level, and the output of NOR gate 280A is determined by the state of memory flip-flop 278A.

Memory flip-flop 278A operates in substantially the same way as flip-flop 278 in FIG. 3C. The flip-flop 278 is reset at the start of a decoding sequence by the "1" level on line 189 from the logic control circuit 14. The state of control flip-flop 215A is examined at the end of each time slot by the action of NOR gate 276A. Line 185 from flip-flop 215A is at a "1" level if a valid tone is received and at a "0" level if the received tone is incorrect. Line 144 from logic control circuit 14 is normally at a "0" level, but rises to the "1" level at the end of each time slot period. The level on line 144 is inverted by inverter 274A and applied as a second input to NOR gate 276A. If at the end of a time slot when line 144 goes to the "1" level and the input from inverter 274A to gate 276A is at the "0" level, line 185 is at the "1" level, the output of gate 276A remains at the "0" level and the flip-flop 278A remains reset. However, if line 185 is at the "0" level at the end of a time slot, line 277A is driven to the "1" level and acts to set memory flip-flop 278A. Then when line 283A is forced to the "0" level after the fifth time slot, the level on line 279A from flip-flop 278A causes the level at the output of NOR gate 280A to be at the "0" level. This output, which is applied by line 187 to the logic control circuit 14, rises to a "1" level when the correct tone sequence has been received. The logic control circuit 14 then provides an alerting audio signal in the manner which has been described.

In the system described, the memory flip-flop 278A could be omitted and the output line 248A connected directly to line 187 to the logic control circuit 14 to indicate that the correct tone sequence has been decoded, as the decoder will not reach the fifth time slot position and provide a "1" level on line 248A unless all tones are correct. However, the circuit shown and described has the advantage that a number of code memories can be incorporated in a single decoder by using well known multiplexing techniques to provide a multiple address decoder. Such a decoder could respond to multiple, independently selectable tone sequences.

The digital decoder systems of FIG. 3 and 4 are alike in that both systems measure the frequency of the received tone by counting the number of clock pulses which occur during a precise number (4) of cycles of the received tone. The binary pulse count reached by the period counter is a measure of the period and the corresponding frequency of the received tone. This pulse count is related to a number stored in a binary code memory which is part of the code plug circuit, in both embodiments. A code plug interface circuit identifies the time slots for the received tones and causes the period counts for a plurality of tones received in sequence, to be processed. The code plug circuit has a memory device which indicates when all the received tones correspond to the numbers stored in the code memory, and the control circuit checks this memory device and produces an audio alert signal to indicate that a valid tone code has been decoded.

The two systems differ in the period count selector circuits, with the system of FIG. 3 including a tone period element for each tone frequency to be received which responds when the period count falls within predetermined limits, and an encoder which provides a binary output to indicate which tone was received. A comparator receives this binary output and a corresponding binary output from the code memory, and indicates when the correct tone has been decoded. The system of FIG. 4 applies the binary period count directly to the comparator, and the code memory is operated to apply a lower period limit, and then an upper period limit to the comparator. The system of FIG. 3 is generally preferable when a small number (such as 12) of different tone frequencies are used, as the code memory and the comparator are less complex than in the system of FIG. 4. The system of FIG. 4 is generally preferable when a large number (more than 20) of different tone frequencies are used, as the period count selector is less complex and does not require the tone period elements and the tone selector encoder.

The two systems specifically described both have the advantages of digital operation with accurate frequency, passband and timing characteristics, of being suitable for implementation as a single integrated chip, and of being adaptable for decoding different types of codes. These systems are representative of other systems which utilize the basic features of the invention.

I claim:

1. A digital decoder for producing an output in response to an input signal wave of a predetermined frequency, which may be one of a plurality of signal waves having different frequencies, including in combination,
   reference means for providing clock pulses of a fixed frequency, which is substantially greater than said predetermined frequency,
   period counter means for producing outputs in response to different numbers of pulses applied thereto to measure the periods of the cycles of the input signal wave,
   gate means for applying clock pulses from said reference means to said period counter means, said gate means including enabling means having an input for receiving the input signal wave, said enabling means being responsive to a particular part of the cycle of the signal wave to enable said gate means to pass clock pulses during a predetermined portion of the input signal wave, and
   address code means coupled to said period counter means and responsive to the outputs therefrom for indicating a signal wave of a predetermined frequency.

2. A digital decoder in accordance with claim 1 wherein said enabling means is responsive to a positive transition of the input signal wave to pass clock pulses to said period counter means which occur during a plurality of periods of the applied signal wave.

3. A digital decoder in accordance with claim 1 further including logic control means for initiating operation of said period counter means and said gate means.

4. A digital decoder in accordance with claim 3 including signal processing means for filtering the input signal wave and applying the filtered wave to said gate means, and wherein said signal processing means has a portion connected to said logic control means to activate the same.

5. A digital decoder in accordance with claim 4 wherein said signal processing means includes a signal oscillator and a phase locked loop for controlling the frequency of said signal oscillator, and including means connecting said loop to said logic control means to activate the same when said signal oscillator is locked in phase to the input signal wave.

6. A digital decoder in accordance with claim 3 wherein said logic control means is coupled to said reference means, and said reference means applies timing pulses to said logic control means.

7. A digital decoder in accordance with claim 4 wherein said address code means includes code plug means having means adapted to be preset to represent a signal wave to be detected, and period count selector means connecting said code plug means to said period counter means.

8. A digital decoder in accordance with claim 7 wherein said code plug means includes memory means having a plurality of sections each being rendered operative in response to an applied signal, and said address code means includes interface means connected to said sections for rendering the same operative in turn in response to a plurality of input signal waves in sequence.

9. A digital decoder in accordance with claim 8 wherein said address code means includes comparator means connected to said selector means and to said memory means, said comparator means producing an output when the condition of said selector means corresponds to the condition of said memory means.

10. A digital decoder in accordance with claim 9 further including logic control means coupled to said period counter means, said gate means, said period count selector means and said code plug means for controlling the operation thereof, and wherein said logic control means is responsive to said output of said comparator means for producing the detector output.

11. A digital decoder in accordance with claim 7 wherein said period count selector means includes a plurality of period elements each of which responds to a signal wave having a frequency which falls within predetermined upper and lower limits.

12. A digital decoder in accordance with claim 11 wherein said period counter means is a binary counter having a plurality of stages each having an output, and wherein said period count selector means includes hexadecimal converter means coupling said outputs of said period counter means to said period elements.

13. A digital decoder in accordance with claim 12 wherein said hexadecimal converter means has a plurality of inputs for receiving binary inputs and a plurality of outputs which identify a unique count, and wherein each period element includes a lower limit gate connected to a plurality of said outputs of said converter means and an upper limit gate connected to a plurality of outputs of said converter means.

14. A digital decoder in accordance with claim 13 wherein each period element includes a flip-flop which is set by said lower limit gate and which is reset by said upper limit gate, and including control means coupled to said flip-flops for interrogating the condition thereof and for indicating a period element having a flip-flop which is set.

15. A digital decoder in accordance with claim 11 wherein said period count selector means includes encoder means connected to said period elements and having binary output means to identify the period element which has responded, and wherein said address code means includes comparator means connected to said binary output means and to said means adapted to be preset and operative to indicate correspondence therebetween, and means coupled to said comparator means and responsive to the operation thereof to indicate the reception of the preset signal wave.

16. A digital decoder in accordance with claim 15 which is adapted to respond to a plurality of signal waves received in sequence, wherein said preset means of said code plug means includes code memory means having a plurality of sections each adapted to provide an output representing one signal wave to be detected, and wherein said address code means includes code plug interface means coupled to said encoder output means and having means coupled to said code memory means and operative to activate said sections of said code memory means in turn, whereby output representing the received signal waves and the preset signal waves are applied to said comparator means in turn.

17. A digital decoder in accordance with claim 16 wherein said means coupled to said comparator means includes a memory device having first and second states, and wherein said memory device is held in said first state by said comparator means in response to outputs from said encoder means which correspond to outputs from said code memory means, and alert signal means coupled to said memory device for producing an alert signal in response to said memory device being held in said first state during a complete sequence of signal waves.

18. A digital decoder in accordance with claim 17 wherein said address code means further includes a group call memory device having first and second states, and control means coupled to encoder means, said comparator means and said code plug interface circuit for holding said group call memory device in said first state upon receipt of a plurality of signal waves which correspond to preset signal waves in said code memory means followed by a particular signal wave, said alert signal means being coupled to said further memory device for producing a group call alert signal when said group call memory device is held in said first state during a complete sequence of signal waves.

19. A digital decoder in accordance with claim 7 wherein said period count selector means includes a digital period comparator which has a first plurality of inputs connected to said period counter means, and a second plurality of inputs connected to said code plug means.

20. A digital decoder in accordance with claim 19 which is adapted to respond to a plurality of signal waves received in sequence, and wherein said code plug means includes code memory means having a plurality of sections with input means connected to said sections for activating the same and output means connected to said sections for reading out numbers programmed in said sections, and means connecting said output means to said digital period comparator.

21. A digital decoder in accordance with claim 20 wherein said period counter means is a binary counter having a plurality of outputs, and said code memory means has binary numbers programmed in said sections thereof, and said output means of said code memory means has the same number of outputs as said period counter means, and wherein said address code means includes code plug interface means connecting said period count selector means to said input means of said code memory means for activating said sections in turn.

22. A digital decoder in accordance with claim 20 wherein each section of said code memory means has a first portion programmed to represent the lower period limit of a signal wave to be received, and a second portion programmed to represent the upper period limit of the signal wave, and wherein said period count selector means is coupled to said input means of said memory means to activate said first portion so that said digital period comparator compares the period of the received signal wave with the lower period limit, said period count selector means responding to the output of said comparator means to activate said second portion so that said digital period comparator compares the period of the received signal wave with the upper period limit.

23. A digital decoder in accordance with claim 22 wherein said address code means includes a memory device having first and second states, and wherein said memory device is held in said first state in response to reception of all signal waves in the sequence which fall within the limits programmed in said code memory means, and alert signal means coupled to said memory device for producing an alert signal in response to said memory device being held in said first state during a complete tone sequence.

24. A digital decoder for producing an output in response to a plurality of input signal waves applied in sequence, each of which input waves has one of a number of different frequencies within a range of frequencies, such decoder including in combination, period measuring means including gate means responsive to an input signal wave and counter means for providing an output count for each input wave, which count is a measure of the periods of the cycles of such input wave, address code means including code memory means, interface means and comparator means coupled to each other, said code memory means having a plurality of sections, one for each of the input waves in the sequence, with each section having information programmed therein related to one of the input frequencies, said interface means being coupled to said memory means for rendering said sections thereof operative in turn, said comparator means being coupled to said counter means and to said memory means and responsive to an output count from said counter means representing the same frequency which is programmed in the operative section of said memory means, and logic control means responsive to the input signal waves and coupled to said counter means and to said interface means for controlling the operation thereof, said logic control means being responsive to a complete sequence of input signal waves which correspond to the programmed information.

25. A digital decoder in accordance with claim 24 wherein each section of said code memory means has a first portion programmed to represent the lower period limit of a signal wave to be decoded and a second portion programmed to represent the upper period limit of such signal wave, and wherein said address code means includes selector means coupled to said memory means to activate said first portions of said sections so that said comparator means compares the output count from said counter means with the lower period limit, said selector means responding to the output of said comparator means to activate said second portion of said memory sections so that said comparator means compares the output count with the upper period limit.

* * * * *